US008363116B2

(12) United States Patent
Ogawa

(10) Patent No.: US 8,363,116 B2
(45) Date of Patent: *Jan. 29, 2013

(54) IMAGE PROCESSING DEVICE, FOCAL PLANE DISTORTION COMPONENT CALCULATION METHOD, IMAGE PROCESSING PROGRAM, AND RECORDING MEDIUM

(75) Inventor: Nobuhiro Ogawa, Tokyo (JP)

(73) Assignee: Sony Corporation (JP)

( * ) Notice: Subject to any disclaimer, the term of this patent is extended or adjusted under 35 U.S.C. 154(b) by 311 days.

This patent is subject to a terminal disclaimer.

(21) Appl. No.: 12/658,739

(22) Filed: Feb. 12, 2010

(65) Prior Publication Data

US 2010/0214423 A1    Aug. 26, 2010

(30) Foreign Application Priority Data

Feb. 19, 2009    (JP) ................................ P2009-036897

(51) Int. Cl.
*H04N 5/228* (2006.01)
(52) U.S. Cl. .................... 348/208.4; 348/154; 348/208.1
(58) Field of Classification Search .......... 348/154–158, 348/208.1–208.5, 208.13–208.14, 208.99; 375/240.22, E7.104, E7.106
See application file for complete search history.

(56) References Cited

U.S. PATENT DOCUMENTS

| 2006/0061658 | A1* | 3/2006 | Faulkner et al. ............ 348/207.1 |
| 2007/0120997 | A1* | 5/2007 | Sasaki et al. ................... 348/362 |
| 2007/0154066 | A1* | 7/2007 | Lin et al. ........................ 382/103 |
| 2007/0228049 | A1* | 10/2007 | Nordmeyer et al. ..... 220/560.07 |
| 2008/0246848 | A1* | 10/2008 | Tsubaki et al. ............ 348/208.4 |
| 2009/0060284 | A1 | 3/2009 | Nagumo et al. |
| 2009/0074071 | A1* | 3/2009 | Nagumo et al. ......... 375/240.16 |
| 2009/0096879 | A1* | 4/2009 | Motomura et al. ........ 348/208.6 |
| 2009/0257498 | A1* | 10/2009 | Kurata ...................... 375/240.16 |
| 2010/0208087 | A1* | 8/2010 | Ogawa ....................... 348/208.4 |
| 2011/0242339 | A1* | 10/2011 | Ogawa ....................... 348/208.4 |

FOREIGN PATENT DOCUMENTS

| JP | 2007208580 A | 8/2007 |
| JP | 2008028500 A | 2/2008 |
| JP | 2008-078808 A | 4/2008 |
| JP | 2008259076 A | 10/2008 |
| JP | 2009-065332 A | 3/2009 |
| JP | 2009-065333 A | 3/2009 |

OTHER PUBLICATIONS

Office Action from Japanese Application No. 2009-036897, dated Mar. 3, 2011.

* cited by examiner

*Primary Examiner* — Jason Chan
*Assistant Examiner* — Abdelaaziz Tissire
(74) *Attorney, Agent, or Firm* — Lerner, David, Littenberg, Krumholz & Mentlik, LLP

(57) ABSTRACT

An image processing device includes: a motion vector receiving unit configured to receive, from frame image data made up of frame images, motion vectors representing motion of the frame images; a modeling unit configured to model the motion vector, received from the motion vector receiving unit, to a component separation expression in which a camera motion component and a focal plane distortion component are separated, using component parameters respectively representing camera motion which is motion of a camera, and the amount in change in focal plane distortion; and a component calculation unit configured to calculate the component parameters used in the component separation expression, thereby calculating the focal plane distortion component in the motion vector.

14 Claims, 26 Drawing Sheets

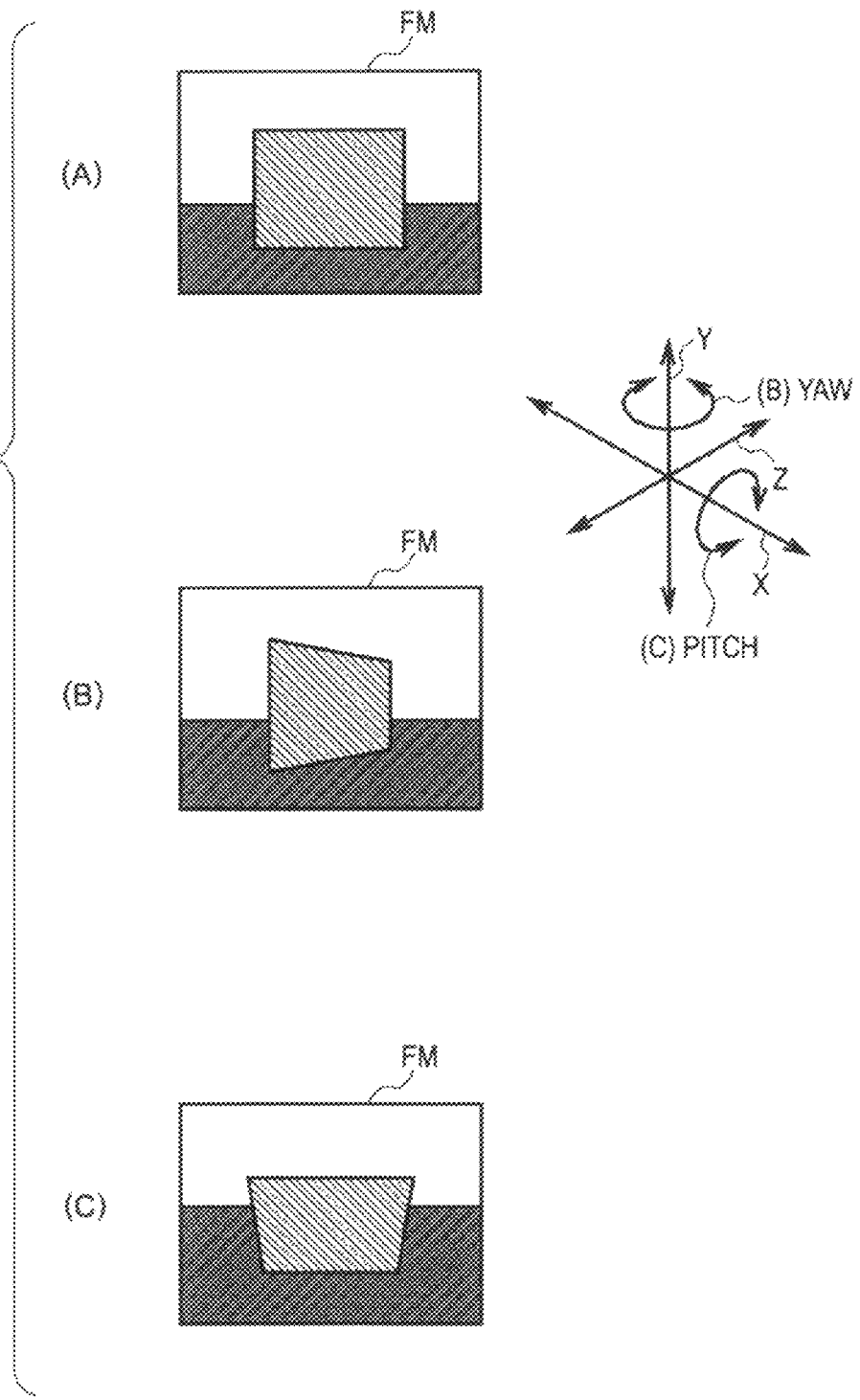

FIG. 13

$$MC1 \begin{pmatrix} 1 & 0 & h_c \\ 0 & 1 & v_c \\ 0 & 0 & 1 \end{pmatrix} MP1 \begin{pmatrix} \frac{1}{p} & 0 & 0 \\ 0 & 1 & 0 \\ 0 & 0 & 1 \end{pmatrix} \underbrace{EFa \begin{pmatrix} 1 & 0 & 0 \\ 0 & e & 0 \\ 0 & 0 & 1 \end{pmatrix} EFb \begin{pmatrix} 1 & b & 0 \\ 0 & 1 & 0 \\ 0 & 0 & 1 \end{pmatrix}}_{CF} \underbrace{EMa \begin{pmatrix} 1 & 0 & h \\ 0 & 1 & v \\ 0 & 0 & 1 \end{pmatrix} EMb \begin{pmatrix} \cos\theta & -\sin\theta & 0 \\ \sin\theta & \cos\theta & 0 \\ 0 & 0 & 1 \end{pmatrix} EMc \begin{pmatrix} s & 0 & 0 \\ 0 & s & 0 \\ 0 & 0 & 1 \end{pmatrix}}_{CM} MP2 \begin{pmatrix} p & 0 & 0 \\ 0 & 1 & 0 \\ 0 & 0 & 1 \end{pmatrix} MC2 \begin{pmatrix} 1 & 0 & -h_c \\ 0 & 1 & -v_c \\ 0 & 0 & 1 \end{pmatrix}$$

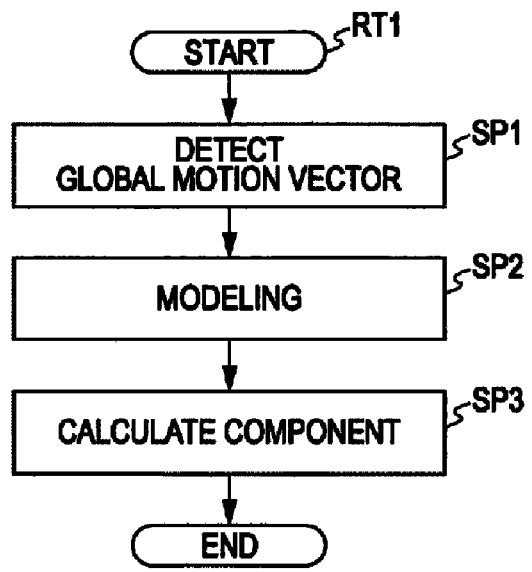
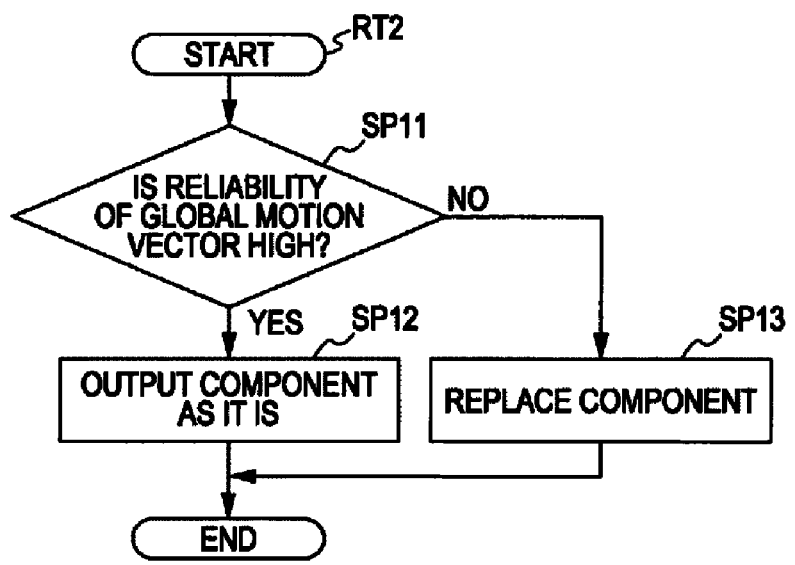

IMAGE PROCESSING DEVICE, FOCAL PLANE DISTORTION COMPONENT CALCULATION METHOD, IMAGE PROCESSING PROGRAM, AND RECORDING MEDIUM

CROSS-REFERENCE TO RELATED APPLICATION

The present application claims priority from Japanese Patent Application No. JP 2009-036897 filed in the Japanese Patent Office on Feb. 19, 2009, the entire content of which is incorporated herein by reference.

BACKGROUND OF THE INVENTION

1. Field of the Invention

The present invention relates to an image processing device, a focal plane distortion component calculation method, an image processing program, and a recording medium, which are suitably applied to an image processing device for editing frame image data imaged with an imaging apparatus, for example.

2. Description of the Related Art

Heretofore, imaging apparatuses have widely employed an arrangement to correct camera shaking due to movement of the hands of the user holding the imaging apparatus, wherein sensors such as acceleration sensors are provided to the imaging apparatus, and optical parts such as lenses are moved so as to cancel out the movement due to camera shaking (e.g., see http:/dspace.wul.waseda.ac.jp/dspace/bitstream/2065/5323/3/Hon bun-4189.pdf "Research on Core Technologies for the Improvement of Vulnerabilities in Video Systems", Mitsuaki Oshima).

Also, with imaging apparatuses, CCDs (Charge Coupled Devices) using the global shutter method have been widely used as imaging devices. CCDs transfer one frame with of data at once.

However, as of recent, CMOS (Complementary Metal Oxide Semiconductor) devices using the foal plane shutter method have come to be widely employed in imaging apparatuses, due to cost-related advantages. CMOS devices transfer data one line at a time, which means that there is a slight temporal divergence in shutter timing within the frame. Accordingly, movement of the imaging device during imaging, such as camera shaking due to shaking of the hands of the user or intentional motion (hereinafter referred to as "camerawork"), can result in focal plane distortion of the subject in frame image data imaged with a CMOS device. To this end, an imaging device has been proposed which is arranged to correct such focal plane distortion in the frame image data (e.g., see Japanese Unexamined Patent Application Publication No. 2008-78808).

SUMMARY OF THE INVENTION

Now, with imaging apparatus having the camera shaking correction function described above, a design is built in where part of the shaking is cancelled out so as to alleviate the shaking, in order to prevent scattering of the control system due to excessive correction. That is to say, with such imaging apparatuses, while the effects of shaking can be alleviated within the frame image data, the effects of shaking still remain in the imaged frame image data. Accordingly, post-processing following imaging to further alleviate the effects of shaking is desirable.

With post-processing the amount of motion of the imaging apparatus itself (hereinafter referred to as "camera motion") is not detected as with the camera shaking correction function built into the imaging apparatus. Also, the method described in Japanese Unexamined Patent Application Publication No. 2008-78808 calls for dividing of the imaging device, and accordingly is not applicable to post-processing.

Accordingly, the image processing device calculates the amount of shaking based on motion vectors detected from the frame image data. However, the frame image data includes focal plane distortion corresponding to the shaking of the imaging apparatus, as described above. This has led to a problem wherein high-precision calculation of shaking is incalculable due to the effects of the focal plane distortion on the motion vectors, and consequently efforts to improve the quality of frame image data have not advanced.

It has been found desirable to provide an image processing device, a focal plane distortion component calculation method, an image processing program, and a recording medium, capable of improving the quality of frame image data.

According to an embodiment of the present invention, an image processing device includes: a motion vector receiving unit configured to receive, from frame image data made up of frame images, motion vectors representing motion of the frame images; a modeling unit configured to model the motion vector, received from the motion vector receiving unit, to a component separation expression in which a camera motion component and a focal plane distortion component are separated, using component parameters respectively representing camera motion which is motion of a camera, and the amount in change in focal plane distortion; and a component calculation unit configured to calculate the component parameters used in the component separation expression, thereby calculating the focal plane distortion component in the motion vector.

According to an embodiment of the present invention, with a focal plane distortion component calculation method, an image processing program for causing a computer to execute the steps of the method, and a recording medium storing the program, the method includes the steps of: receiving, from frame image data made up of frame images, motion vectors representing motion of the frame images; modeling the motion vector, received in the receiving, to a component separation expression in which a camera motion component and a focal plane distortion component are separated, using component parameters respectively representing camera motion which is motion of a camera, and the amount in change in focal plane distortion; and calculating the component parameters used in the component separation expression, thereby calculating the focal plane distortion component in the motion vector.

According to the above configurations, various types of processing for improving quality of frame image data can be carried out based on the focal plane distortion component calculated from the motion vector, thereby realizing an image processing device, a focal plane distortion component calculation method, an image processing program, and a recording medium storing the image processing program, capable of improving quality of frame image data.

BRIEF DESCRIPTION OF THE DRAWINGS

FIG. 9 is a schematic drawing illustrating change in an image due to shaking;

FIG. 13 is a schematic diagram illustrating the makeup of a component separation model;

FIG. 14 is a flowchart for describing component calculation processing procedures;

FIG. 15 is a flowchart for describing filtering processing procedures;

DESCRIPTION OF THE PREFERRED EMBODIMENTS

Embodiments of the present invention will be described with reference to the drawings. Description will proceed in the following order.

1. First Embodiment (Removal of Focal Plane Distortion Amount From Shaking Amount)

2. Second Embodiment (Estimation of Trapezoidal Distortion)

3. Third Embodiment (Removal of Trapezoidal Distortion From Shaking Amount)

4. Fourth Embodiment (Changing Estimation Value of Trapezoidal Distortion)

5. Other Embodiments

1. First Embodiment

1-1. Overall Configuration

Figure 1:
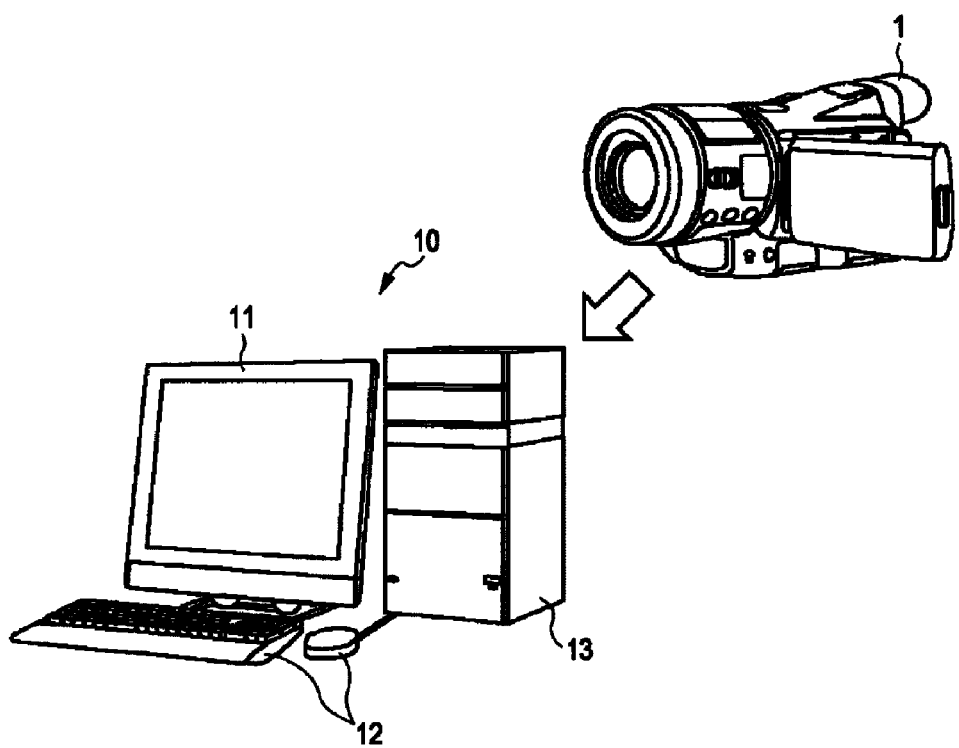
FIG. 1 is a schematic drawing illustrating the external configuration of an image processing terminal.

As shown in FIG. 1, an image processing terminal 10 is configured having a monitor unit 11, an operating unit 12, and an image processing unit 13. The image processing terminal 10 supplies frame image data supplied from a camcorder 1 to the image processing unit 13. The image processing unit 13 detects a global motion vector GMV from the frame image data making up a frame image. This global motion vector GMV represents the motion vector of the entire frame image.

Figure 2:
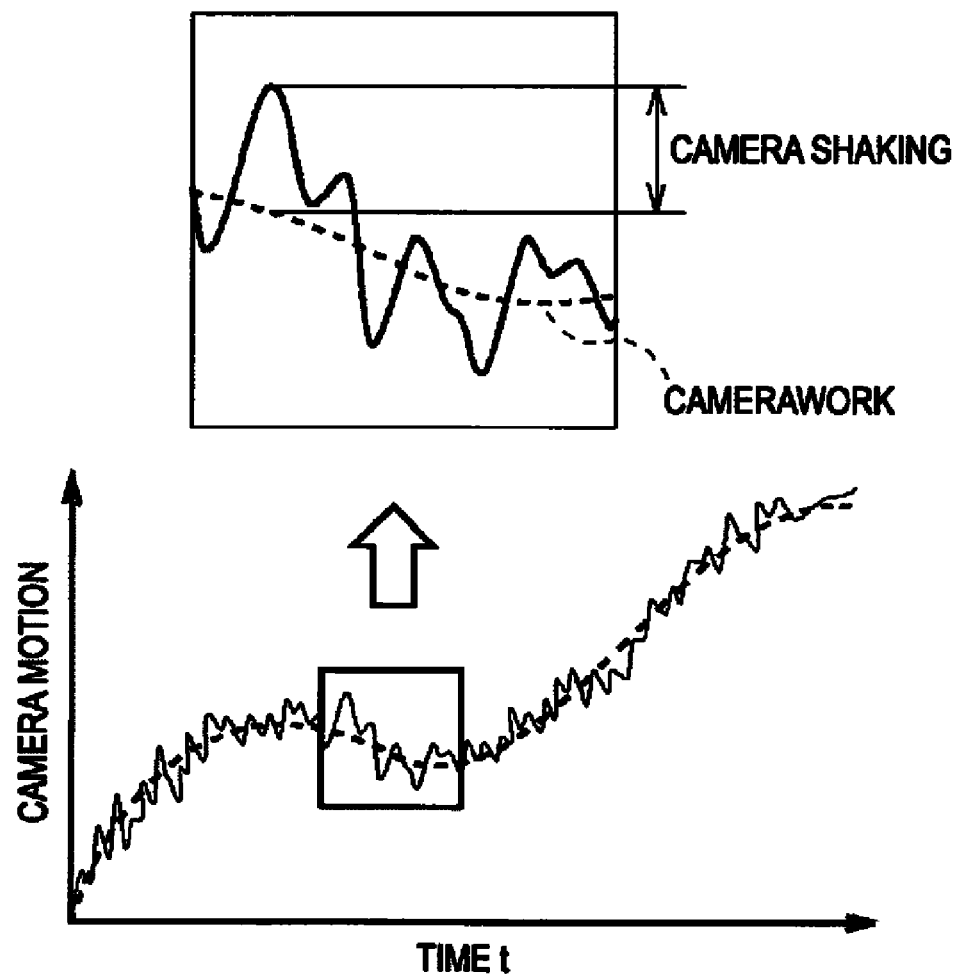
FIG. 2 is a schematic drawing illustrating the relation between camera motion and camerawork.

As described above, the global motion vector GMV includes, besides the amount of motion of the camera (hereinafter referred to as "camera motion"), a focal plane distortion component CF which is the amount of change of the focal plane distortion. Also, as shown in FIG. 2, the camera motion includes both movement which the user has intended (hereinafter referred to as "camerawork"), and shaking which is unintentional motion (hereinafter referred to as "camera shaking" or simply "shaking"). Accordingly, the image processing unit 13 is arranged to first remove the focal plane distortion component CF from the global motion vector GMV, and then to correct the camera shaking.

Figure 3:
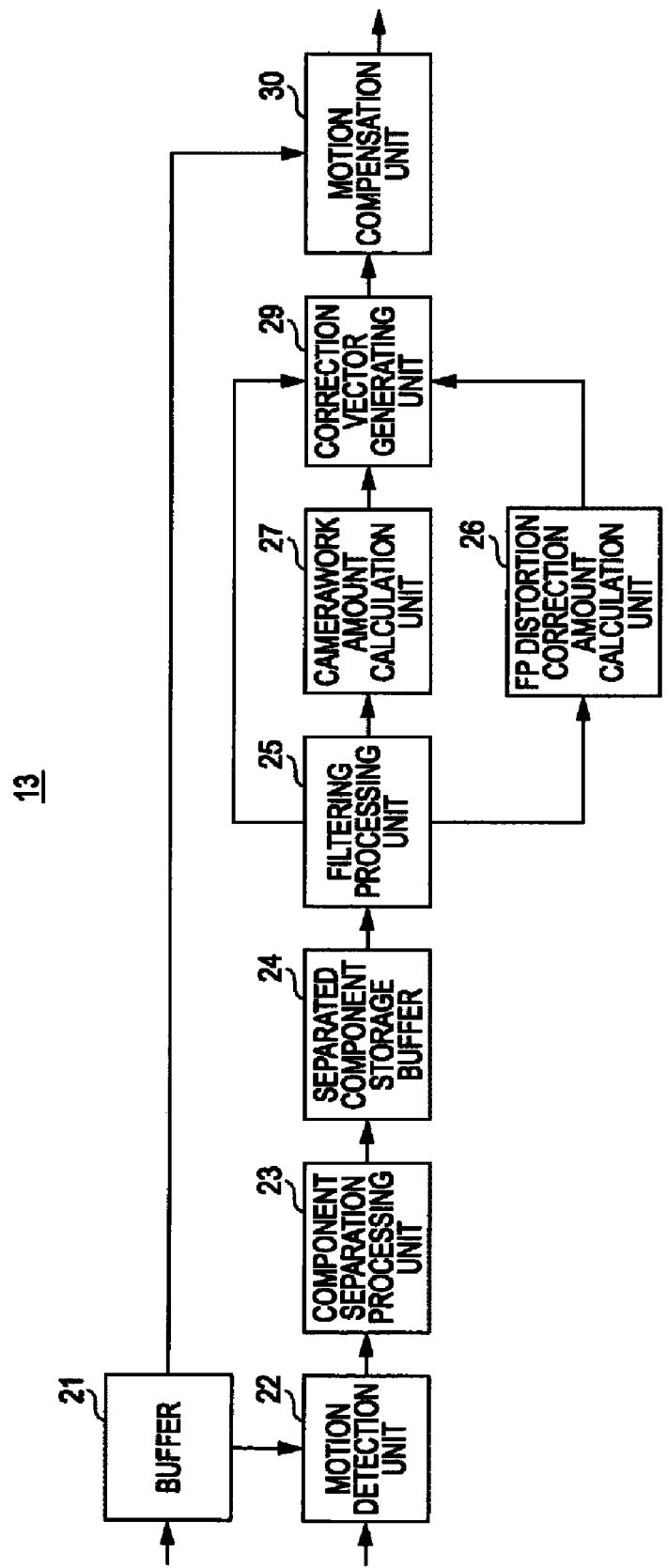
FIG. 3 is a schematic drawing illustrating the configuration of an image processing unit according to a first embodiment.
Figure 4:
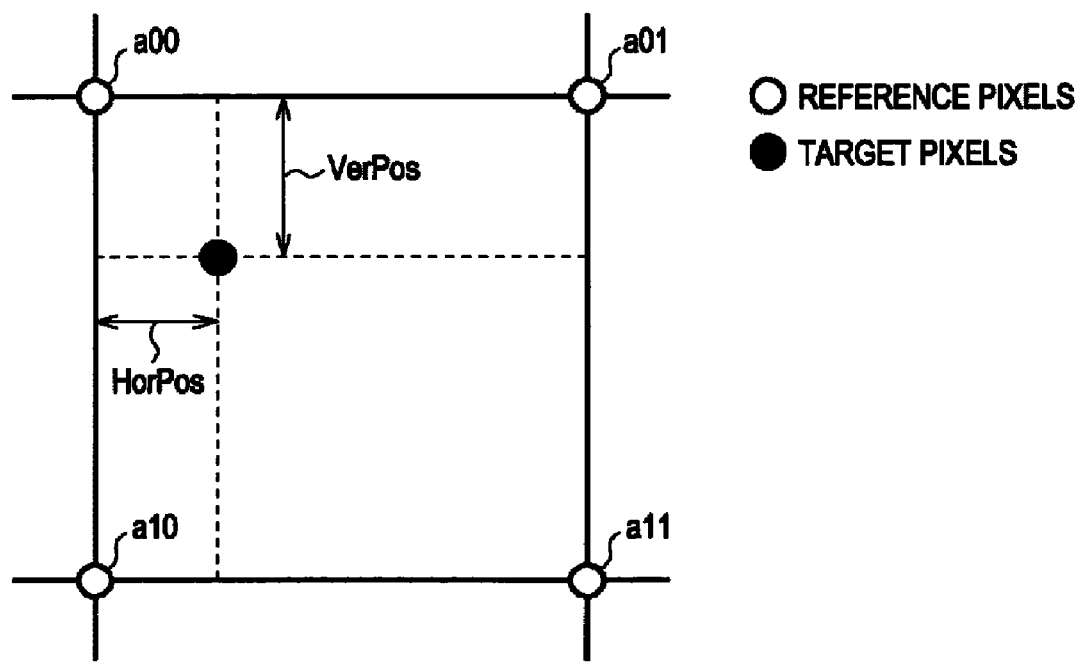
FIG. 4 is a schematic drawing for describing linear interpolation in motion compensation processing.

As shown in FIG. 3, the image processing unit 13 supplies frame image data to a buffer 21 and a motion detection unit 22 for each frame image. The motion detection unit 22 calculates a global motion vector GMV which represents the motion vector of the overall frame image, using later-described motion detection processing, based on the frame image to be processed, and a reference frame image which is the immediately preceding frame image supplied from the buffer 21. The motion detection unit 22 generates reliability information representing the reliability of the global motion vector GMV at this time, and supplies the reliability information along with the global motion vector GMV to a component separation processing unit 23.

The component separation processing unit 23 separates the global motion vector GMV into a camera motion component CM representing the amount of camera motion, and the focal plane distortion component CF representing the amount of change of focal plane distortion, using later-described component separation processing. The component separation processing unit 23 then supplies the focal plane distortion component CF, the camera motion component CM, and the reliability information to a separated component storage buffer 24. The separated component storage buffer 24 is a FIFO (First In First Out) buffer for example, which accumulates and temporarily stores the focal plane distortion component CF, camera motion component CM, and reliability information.

The filtering processing unit 25 performs filtering of the camera motion component CM and focal plane distortion component CF based on the reliability information, using later-described filtering processing. The filtering processing unit 25 then supplies the camera motion component CM following filtering to a camerawork amount calculation unit 27 and correction vector generating unit 29. The filtering processing unit 25 also supplies the camera motion component CM and focal plane distortion component CF following filtering to a FP distortion correction amount calculation unit 26.

The FP distortion correction amount calculation unit 26 performs FP distortion correction amount calculation processing (described later in detail) to generate an FP distortion correction amount CFc which is the amount of correction as to the focal plane distortion, and supplies the FP distortion correction amount CFc to the correction vector generating unit 29.

The camerawork amount calculation unit 27 subjects the camera motion component CM supplied from the filtering processing unit 25 to later-described camerawork amount calculation processing, thereby calculating a camerawork amount, which is supplied to the correction vector generating unit 29.

The correction vector generating unit 29 performs later-described correction vector generating processing to generate a correction vector Vc based on the camerawork amount and the FP distortion correction amount Cfc, which is then supplied to a motion compensation unit 30. This correction vector Vc is for correction of shaking and focal plane distortion.

The motion compensation unit 30 applies the correction vector Vc to the processing frame image supplied from the buffer 21, thereby executing motion compensation processing. Note that the motion compensation unit 30 crops out the frame image in sizes smaller than the frame image itself to perform shaking and focal plane distortion correction. Accordingly, the motion compensation unit 30 performs linear interpolation with precision of one pixel or smaller (e.g., ½ pixel precision, ¼ pixel precision, etc.) to raise the resolution which has dropped.

The motion compensation unit 30 sequentially supplies the frame images subjected to linear interpolation to the monitor unit 11 shown in FIG. 1. Consequently, frame images of which the shaking and focal plane distortion have been corrected, are sequentially displayed on the monitor unit 11. Thus, the image processing unit 13 of the image processing terminal 10 corrects shaking and focal plane distortion of frame image data.

1-2. Motion Detection Processing

The motion detection unit 22 executes motion detection processing, to detect a global motion vector GMV which represents the overall motion of the processing frame image to be processed, from the reference frame image to be referenced and the processing frame image to be processed, which are supplied thereto.

Figure 5A:
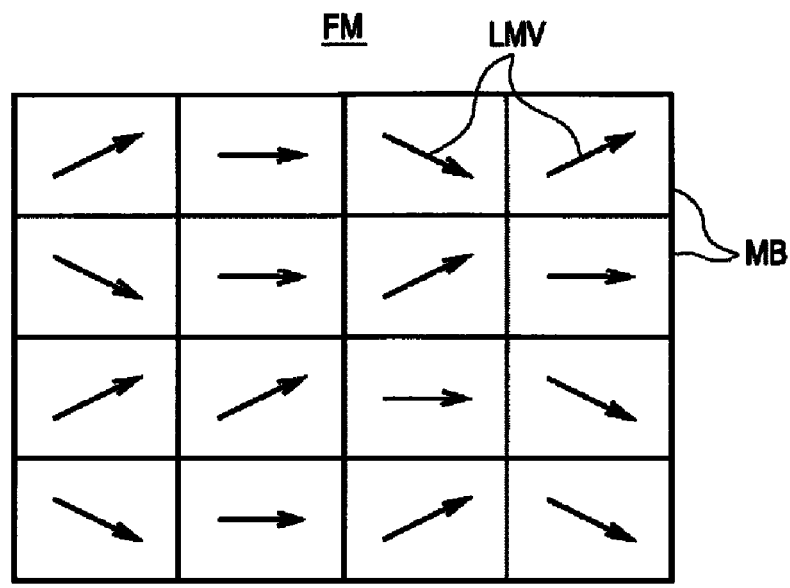
FIGS. 5A and 5B are schematic drawings for describing generating of a global motion vector.

As shown in FIG. 5A, the motion detection unit 22 calculates a motion vector of the processing frame image as to the reference frame image (hereinafter referred to as "local motion vector LMV") for each pixel block increment made up of a predetermined number of pixels. For example, the motion detection unit 22 performs block matching on macro blocks of 16×16 pixels, serving as pixel block increments, and calculates the local motion vector LMV.

Figure 5B:
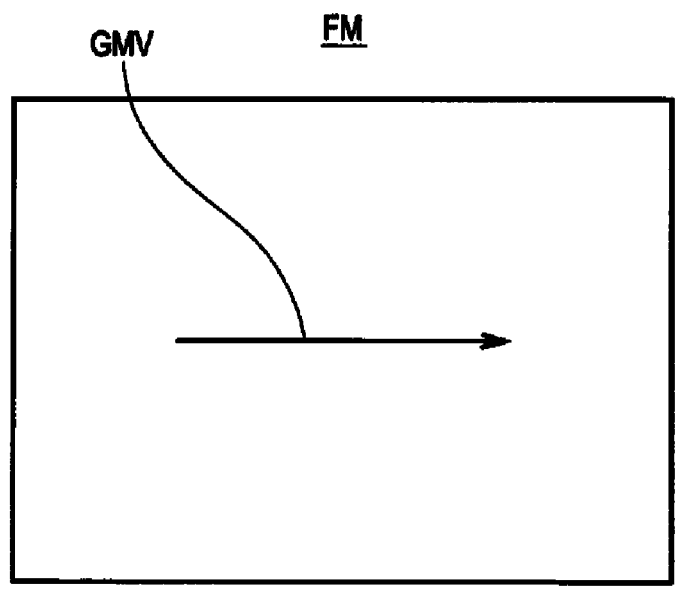

At this time, the motion detection unit 22 calculates a global motion vector GMV as shown in FIG. 5B, by weighting the local motion vectors LMV using various reliability indices representing the reliability of the local motion vectors LMV. Examples of reliability indices include the size of the local motion vector LMV, sum of absolute differences, variance of pixel values making up the block, covariance values calculated from pixel values making up corresponding blocks in the reference frame image data and processing frame image data, and combinations thereof. Detailed methods for calculating global motion vectors GMV are described in Japanese Unexamined Patent Application Publication No. 2007-230053 and Japanese Unexamined Patent Application Publication No. 2007-230054.

The higher the reliability index is, the higher the reliability of each local motion vector LMV is. Also, the higher the reliability of the local motion vector LMV is, the higher the reliability of the global motion vector GMV is. Accordingly, the motion detection unit 22 uses the reliability index for the processing frame image data as reliability information for the global motion vector GMV corresponding thereto.

In this way, the motion detection unit 22 calculates the global motion vector GMV representing the motion of the entire processing frame image based on the local motion vectors LMV calculated for each macro block. At this time, the motion detection unit 22 uses the reliability index for the local motion vector LMV as reliability information for the global motion vector GMV.

1-3. Component Separation Processing

Figure 6:
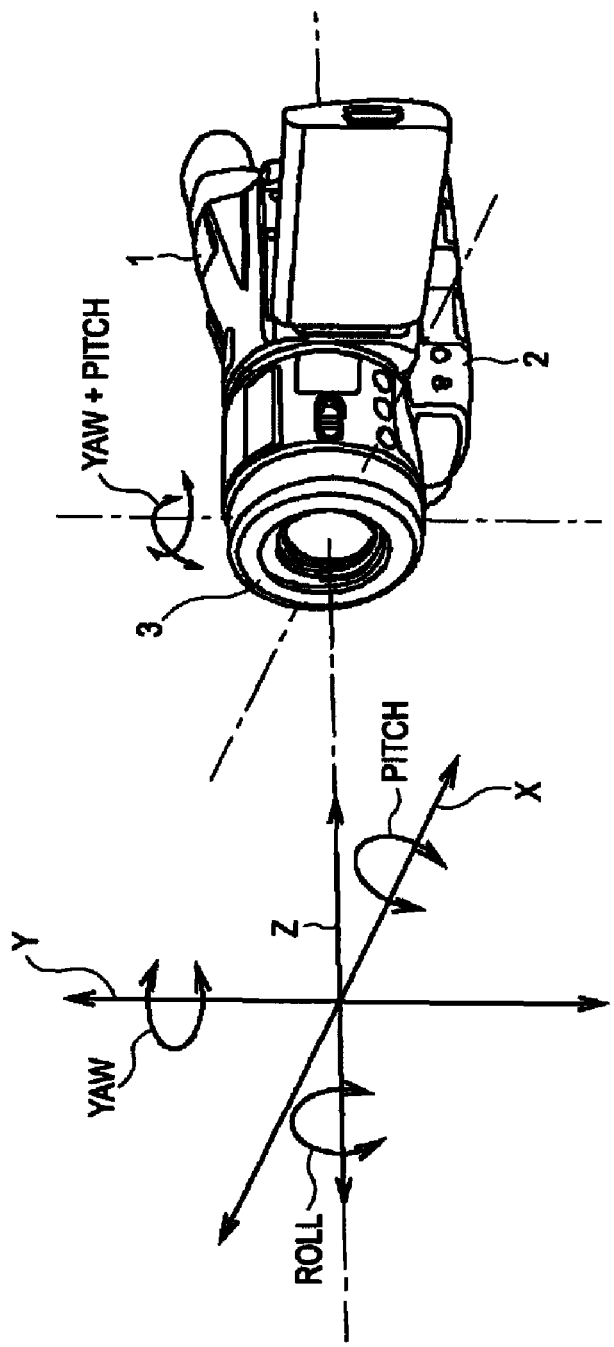
FIG. 6 is a schematic drawing for describing definitions of directions as related to a camcorder.

First, the camcorder 1 serving as an imaging apparatus, and directions in relation to the camcorder 1, will be described with reference to FIG. 6.

With the imaged image which is imaged by the camcorder 1 as a reference, the X-axial direction regarding which the subject moves sideways due to movement of the camcorder 1 is called the "horizontal direction", the Y-axial direction regarding which the subject moves vertically due to movement of the camcorder 1 is called the "vertical direction", and the Z-axial direction regarding which the subject is enlarged or reduced due to movement of the camcorder 1 is called the "enlargement/reduction direction". Also, rotation on the X axis is called "pitch", rotation on the Y axis is called "yaw", and rotation on the Z axis is called "roll". Further, the direction regarding which the subject moves due to movement of the camcorder 1 in the horizontal direction is called "sideways", and the direction regarding which the subject moves due to movement of the camcorder 1 in the vertical direction is called "vertical".

The image processing unit 13 of the image processing terminal 10 performs the component separating processing using the component separation processing unit 23. Now, the global motion vector GMV which represents the motion of the entire frame image has various components, and modeling all of the components would lead to a great increase in the processing load on the image processing unit 13. To deal with this, the image processing unit 13 fictitiously presumes that the global motion vector GMV is configured of only the camera motion component CM which is the motion of the camera, and the focal plane distortion component CF which is the amount of change of focal plane distortion.

The component separation processing unit 23 of the image processing unit 13 applies the global motion vector GMV to a component separation model which is separated into the camera motion component CM and focal plane distortion component CF using unknown parameters, and generates a component separation expression. The component separation processing unit 23 calculates both the camera motion component CM and the focal plane distortion component CF by calculating the component parameters in the component separation expression.

Figure 7:
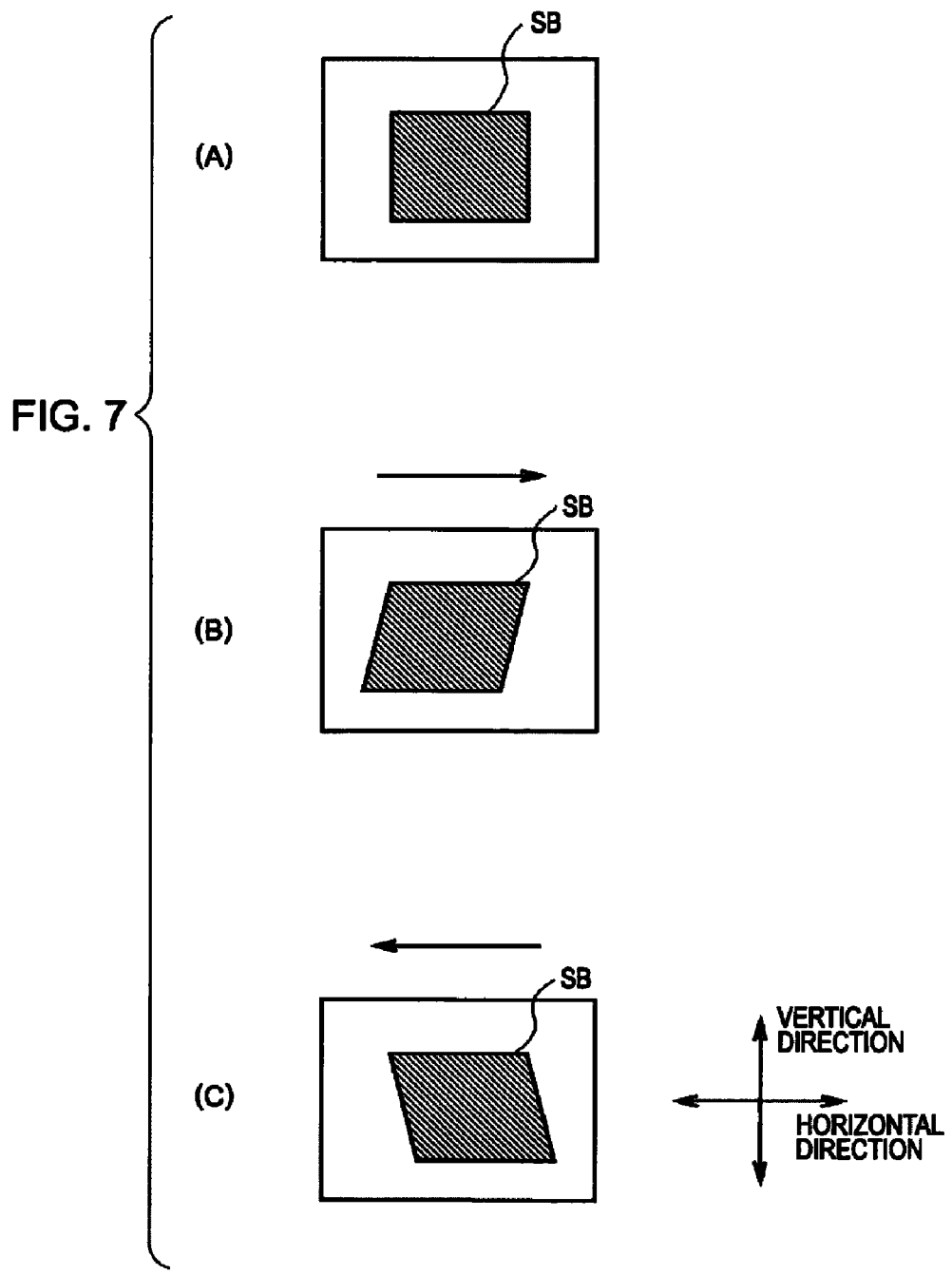
FIG. 7 is a schematic drawing for describing focal plane distortion due to shaking in the horizontal direction.
Figure 8:
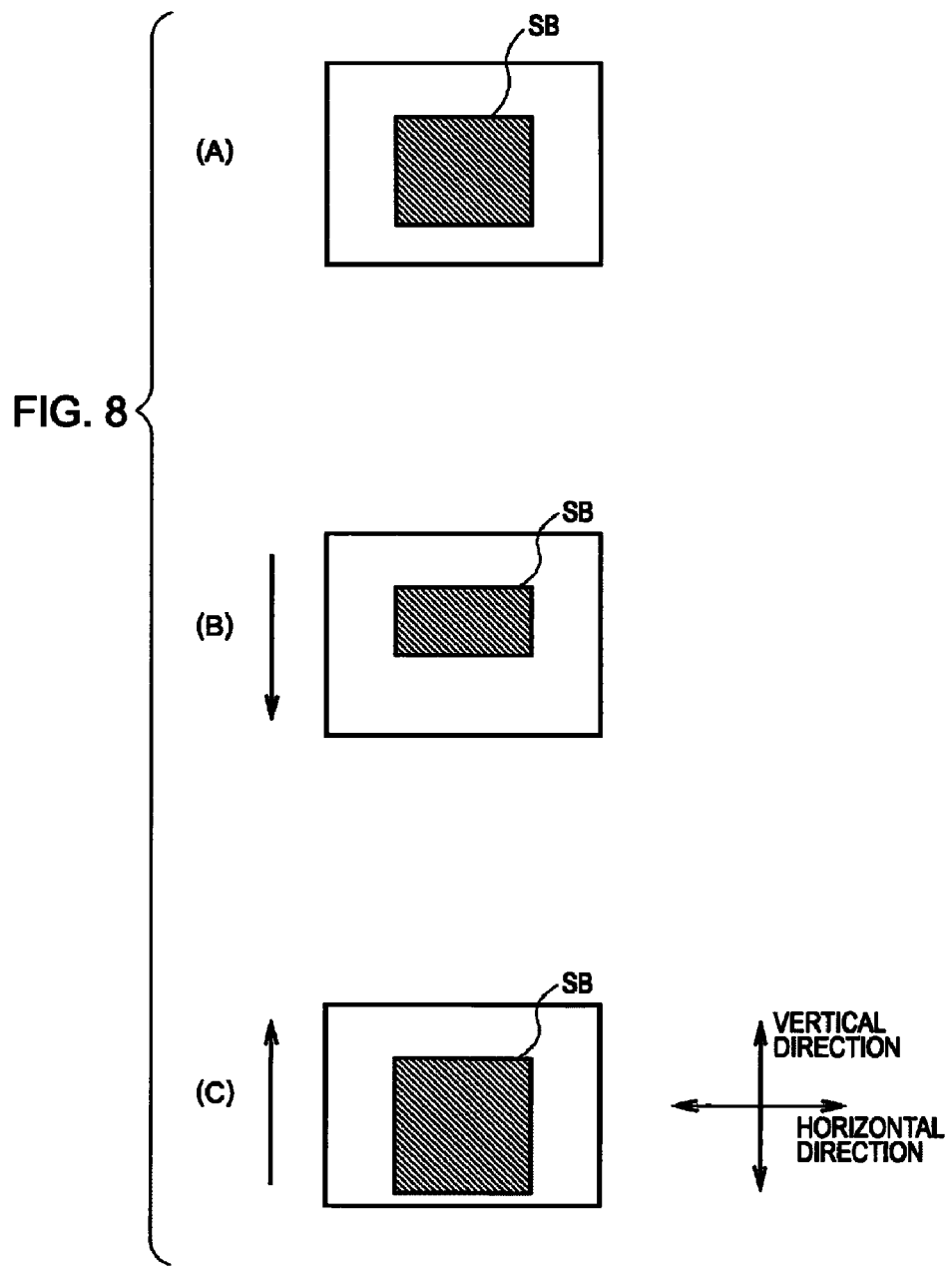
FIG. 8 is a schematic drawing for describing focal plane distortion due to shaking in the vertical direction.

In the event that the camcorder 1 moves in the horizontal direction as indicated by arrows in (B) and (C) in FIG. 7 while imaging a rectangular subject SB shown in (A) in FIG. 7 for example, the above-described focal plane distortion causes the top and bottom sides of the subject SB to be horizontally shifted in the frame image, resulting in distortion in a parallelogram form. On the other hand, in the event that the camcorder 1 moves in the vertical direction as indicated by arrows in (B) and (C) in FIG. 8 while imaging the rectangular subject SB shown in (A) in FIG. 8, the top and bottom positions of the subject SB are shifted in the vertical direction, such that the subject SB is enlarged/reduced in the vertical direction.

Accordingly, as shown in Expression (1), the image processing unit 13 models the focal plane distortion component CF using an FP distortion vertical direction enlargement/reduction element EFa and an FP distortion parallelogram element EFb, where e is a component parameter representing vertical direction enlargement/reduction, and b is a component parameter representing the degree of parallelogram distortion.

$$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \qquad (1)$$

Generally, the camera motion component CM is made up of linear transformation and rotational transformation. Linear transformation is made up of a translational element representing translational speed in which the subject SB moves in the horizontal direction and the vertical direction, and an enlargement/reduction element representing the enlargement/reduction speed at which the subject is enlarged or reduced. Rotational transformation is made up of a rotational element representing angular change of the subject SB in the three directions of yaw, pitch, and roll.

Now, a model of the translational element, enlargement/reduction element, and rotational element including angular change corresponding to the three directions, can be expressed as projected transformation as shown in Expression (2).

$$\begin{pmatrix} x_1 \\ y_1 \\ 1 \end{pmatrix} = \frac{1}{c_1 x + c_2 y + c_0} \begin{pmatrix} a_1 & a_2 & a_0 \\ b_1 & b_2 & b_0 \\ c_1 & c_2 & c_0 \end{pmatrix} \begin{pmatrix} x_0 \\ y_0 \\ 1 \end{pmatrix} \qquad (2)$$

However, the transformation expression for projected transformation is not linear and accordingly is unobtainable with the least square method, so a gradient method such as the steepest descent method has to be used. Using such a gradient method is disadvantageous in that an incorrect solution may be obtained depending on the initial value, and further, the amount of processing is great.

With the first embodiment, we will assume that the supplied frame image data has been imaged by a camcorder 1 having a configuration described below.

Now, (B) and (C) in FIG. 9 illustrate change of the subject SB in a frame image FM imaged as shown in (A) in the event that the camcorder 1 is moved in the yaw direction and pitch direction. The arrows shown to the right of FIG. 9 are based on the camcorder 1. As shown in (B) and (C) in FIG. 9, with the camcorder 1, the position and angle of the subject SB changes in the frame image FM due to the positional relation between the lens unit 3 and the subject SB changing in accordance with the motion of the camcorder 1.

If simply maintaining the position of the subject SB so as to be constant were sufficient, all that has to be done would be to correct one of translational element and enlargement reduction element, or rotational element and enlargement reduction element. However, such correction does not appropriately correct the angular change of the subject SB, resulting in sides being intermittently visible and not visible, occlusions, and distortion of the subject in a trapezoid manner (hereinafter, these will all be collectively referred to as "trapezoidal distortion").

The camcorder 1 has an unshown acceleration sensor, which detects the camera motion amount which is the movement of the camera, and calculates unintentional shaking amount from the camera motion amount. The lens unit 3 attached to the main unit 2 moves in the yaw and pitch directions, thereby physically canceling out the shaking amount, and suppressing change in the positional relation between the subject SB and lens unit 3.

Thus, the camcorder 1 suppresses the positional and angular change of the subject SB in the frame image FM in accordance with shaking in the yaw and pitch directions such as shown in (B) and (C) in FIG. 9. That is to say, the frame image data supplied from the camcorder 1 is subjected to suppression in angular change of the subject SB in the frame image FM that occurs due to movement of the camcorder in the yaw and pitch directions.

Accordingly, the image processing unit 13 of the image processing terminal 10 fictitiously presumes that of the camera motion amount, the rotational element EMb is only angular change in the roll direction, and the camera motion component CM is modeled as shown in Expression (3).

$$\begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} s & 0 & 0 \\ 0 & s & 0 \\ 0 & 0 & 1 \end{pmatrix} \qquad (3)$$

Note that the three matrices in Expression (3) are, from the left, translational element EMa, rotational element EMb, and enlargement/reduction element EMc. In Expression (3), h is a component parameter representing translation in the vertical direction, v is a component parameter representing translation in the horizontal direction, $\cos\theta$ and $\sin\theta$ are component parameters representing rotation in the roll direction, and s is a component parameter representing enlargement/reduction due to change in distance between the subject and the camcorder 1.

Accordingly, the image processing unit 13 can apply affine transformation wherein the global motion vector GMV is represented by one direction of rotational transform and three directions of linear transform. Consequently, the image processing unit 13 can use general transform matrices to calculate component parameters, thereby markedly alleviating the processing load for calculating component parameters. Also, the image processing unit 13 can calculate a certain set solution, and accordingly does not calculate erroneous solutions as with a gradient method.

Further, the component separation processing unit 23 subjects the focal plane distortion component CF and camera motion component CM to origin correction and pixel correction.

Figure 10A:
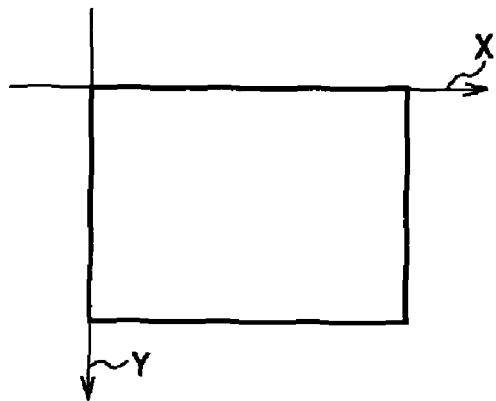
FIGS. 10A through 10C are schematic drawings illustrating center-of-rotation coordinates.
Figure 10B:
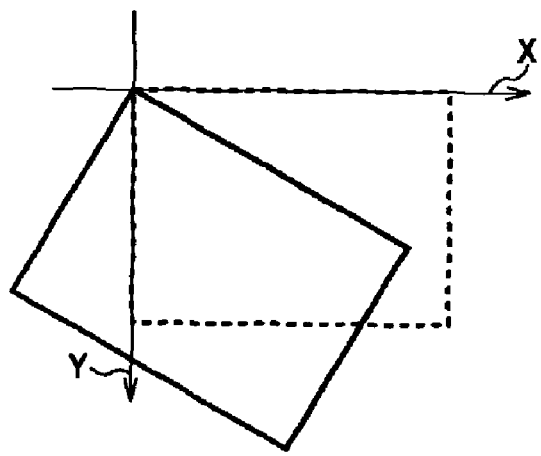
Figure 10C:
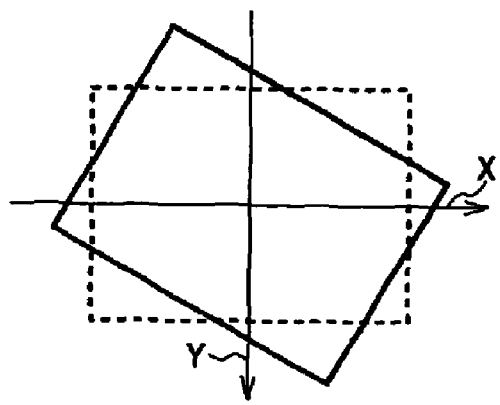

As shown in FIG. 10A, generally, when performing image processing using software, the upper left corner of the frame image is the origin of the coordinate system. That is to say, in the event of rotating the coordinate system, the frame image rotates on the farthest upper left pixel of the frame image as the center of rotation. However, the camcorder 1 does not rotate on the upper left corner of itself. Since the user will most likely be trying to shoot images with the subject SB situated at the middle, using the center of the frame image as the center of rotation of the coordinates should be desirable, as shown in FIG. 10C.

Accordingly, the component separation processing unit 23 multiples the focal plane distortion component CF and camera motion component CM by an origin correction matrix MC1 beforehand, thereby moving the origin to the middle, as shown in Expression (4). In Expression (4), $h_c$ represents ½ of the number of pixels in the vertical direction of the frame image, and $v_c$ represents ½ of the number of pixels in the horizontal direction of the frame image.

$$\begin{pmatrix} 1 & 0 & -h_c \\ 0 & 1 & -v_c \\ 0 & 0 & 1 \end{pmatrix} \quad (4)$$

At the end, the component separation processing unit 23 multiplies the focal plane distortion component CF and camera motion component CM by an origin correction inverse matrix MC2 which is an inverse matrix of the origin correction matrix MC1 as shown in Expression (5), thereby returning the origin to the upper left of the frame image, i.e., to the position where it was before being moved to the middle.

$$\begin{pmatrix} 1 & 0 & h_c \\ 0 & 1 & v_c \\ 0 & 0 & 1 \end{pmatrix} \quad (5)$$

Thus, the component separation processing unit 23 can calculate the focal plane distortion component CF and camera motion component CM in a state with the origin moved to the middle of the frame image.

Figure 11A:
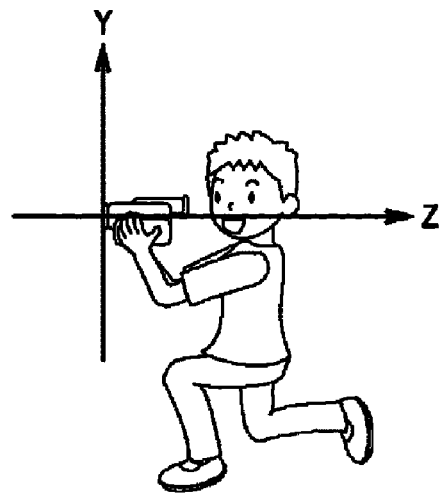
FIGS. 11A through 11C are schematic drawings for describing camera motion with a user elbow as the center.
Figure 11B:
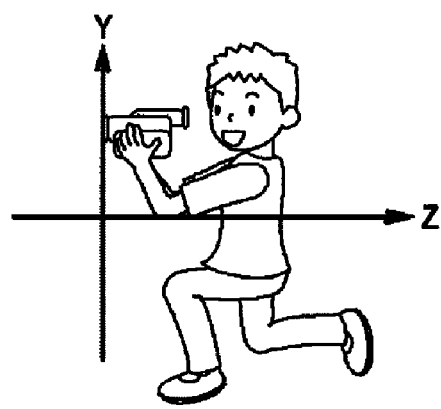
Figure 11C:
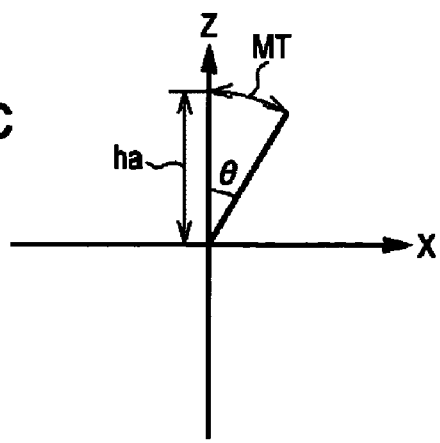

Now, a user who is actually shooting images does not rotate the camcorder 1 with the center of the frame image being imaged as the center of rotation such as shown FIG. 11A, but rather rotates the camcorder 1 on an axis at the elbow, wrist, or the like, in almost all cases, such as shown FIG. 11B. In the event of moving the camcorder 1 by motion amount MT due to rotation on the elbow for example, such as shown FIG. 11C, the motion vector due to the motion amount MT can be expressed as shown in Expression (6), where $h_a$ represents the distance from the elbow which is the rotational axis to the center of the frame image at the camcorder 1.

$$\begin{pmatrix} 1 & 0 & 0 \\ 0 & 1 & h \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} 1 & 0 & 0 \\ 0 & 1 & -h \\ 0 & 0 & 1 \end{pmatrix} = \quad (6)$$

$$\begin{pmatrix} \cos\theta & -\sin\theta & h\sin\theta \\ \sin\theta & \cos\theta & -h\cos\theta + h \\ 0 & 0 & 1 \end{pmatrix} =$$

$$\begin{pmatrix} 1 & 0 & h\sin\theta \\ 0 & 1 & -h\cos\theta + h \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$

That is to say, the motion vector due to the motion amount MT can be expressed as a combination of rotational and translational motions as viewed from the origin, so the positional of the rotational axis being different is not detrimental.

Figure 12A:
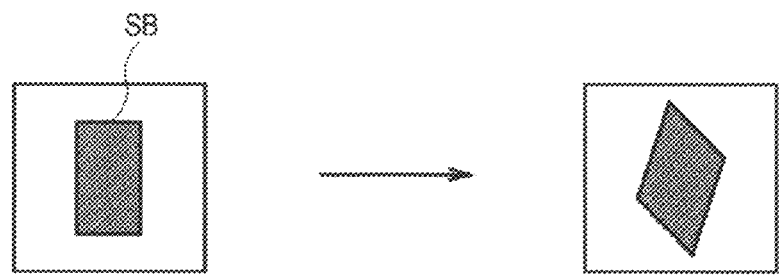
FIGS. 12A and 12B are schematic drawings for describing conversion of aspect ratio.
Figure 12B:
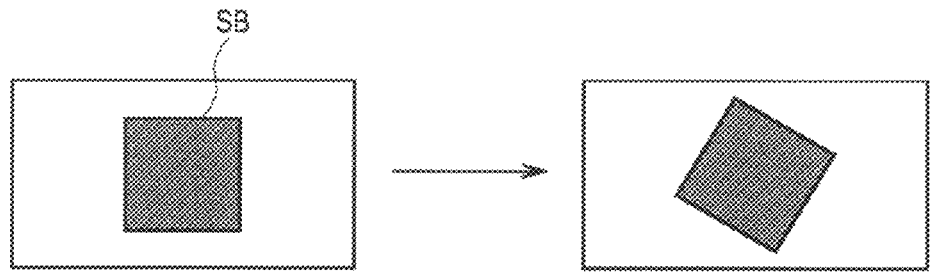

Also, generally, the aspect ratio of the pixels in a frame image of frame image data is not 1:1. As can be seen in FIG. 12A, multiplying a pixel which is rectangular, for example, by the rotational element EMb, as shown in FIG. 12A, the rectangular is distorted into a parallelogram in accordance with rotation as shown to the right, due to the horizontal and vertical scales not being the same.

Accordingly, the component separation processing unit 23 multiplies by a pixel correction matrix MP1 shown in Expression (7), thereby temporarily converting pixels which are not squares into square shapes before multiplication of the rotational element EMb. Note that in Expression (7), p represents the pixel ratio in the event that one side of the pixel is "1".

$$\begin{pmatrix} p & 0 & 0 \\ 0 & 1 & 0 \\ 0 & 0 & 1 \end{pmatrix} \quad (7)$$

Following multiplication of the rotational element EMb, the component separation processing unit 23 multiplies by a pixel correction inverse matrix MP2 (Expression (8)) which is an inverse matrix of the pixel correction matrix MP1, thereby reconverting the pixels converted into squares back to the original aspect ratio.

$$\begin{pmatrix} \frac{1}{p} & 0 & 0 \\ 0 & 1 & 0 \\ 0 & 0 & 1 \end{pmatrix} \quad (8)$$

That is to say, the component separation processing unit 23 multiplies the pixel correction matrix MP1 and pixel correction inverse matrix MP2 before and after the rotational element EMb, as shown in Expression 9.

$$\begin{pmatrix} \frac{1}{p} & 0 & 0 \\ 0 & 1 & 0 \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} p & 0 & 0 \\ 0 & 1 & 0 \\ 0 & 0 & 1 \end{pmatrix} \quad (9)$$

As shown in FIG. 13, the component separation processing unit 23 uses a component separation model wherein, upon correcting the origin and aspect ratio, separation is performed into the focal plane distortion component CF and camera motion component CM using unknown component parameters. Subsequently, the component separation processing unit 23 fits the global motion vector GMV to the component separation model so as to model the global motion vector GMV, and finally returns the origin and pixel aspect ratio back to what they were, at the end of the component separation expression.

In actual practice, the motion detection unit 22 of the image processing unit 13 calculates the global motion vector GMV as an affine transform matrix expression as shown in Expression (10).

$$\begin{pmatrix} x_1 \\ y_1 \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x_0 \\ y_0 \\ 1 \end{pmatrix} \quad (10)$$

Upon the global motion vector GMV being supplied from the motion detection unit 22, the component separation processing unit 23 fits the global motion vector GMV to the component separation model shown in FIG. 13, thereby generating the component separation expression shown in Expression (11).

$$\begin{pmatrix} x_1 \\ y_1 \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x_0 \\ y_0 \\ 1 \end{pmatrix} \quad (11)$$

$$= \begin{pmatrix} 1 & 0 & h_c \\ 0 & 1 & v_c \\ 0 & 0 & 1 \end{pmatrix} \begin{pmatrix} \frac{1}{p} & 0 & 0 \\ 0 & 1 & 0 \\ 0 & 0 & 1 \end{pmatrix} \begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix}$$

$$\begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} s & 0 & 0 \\ 0 & s & 0 \\ 0 & 0 & 1 \end{pmatrix} \begin{pmatrix} p & 0 & 0 \\ 0 & 1 & 0 \\ 0 & 0 & 1 \end{pmatrix}$$

$$\begin{pmatrix} 1 & 0 & -h_c \\ 0 & 1 & -v_c \\ 0 & 0 & 1 \end{pmatrix} \begin{pmatrix} x_0 \\ y_0 \\ 1 \end{pmatrix}$$

The component separation processing unit 23 then modifies Expression (11) into Expression (12).

$$\begin{pmatrix} x_1 \\ y_1 \\ 1 \end{pmatrix} = \begin{pmatrix} \frac{1}{p} & 0 & 0 \\ 0 & 1 & 0 \\ 0 & 0 & 1 \end{pmatrix}^{-1} \begin{pmatrix} 1 & 0 & h_c \\ 0 & 1 & v_c \\ 0 & 0 & 1 \end{pmatrix}^{-1} \begin{pmatrix} A_1 & A_2 & A_0 \\ B_1 & B_2 & B_0 \\ 0 & 0 & 1 \end{pmatrix} \quad (12)$$

$$\begin{pmatrix} 1 & 0 & -h_c \\ 0 & 1 & -v_c \\ 0 & 0 & 1 \end{pmatrix}^{-1} \begin{pmatrix} p & 0 & 0 \\ 0 & 1 & 0 \\ 0 & 0 & 1 \end{pmatrix}^{-1} \begin{pmatrix} x_0 \\ y_0 \\ 1 \end{pmatrix}$$

$$= \begin{pmatrix} a_1 & a_2 & a_0 \\ b_1 & b_2 & b_0 \\ 0 & 0 & 1 \end{pmatrix} \begin{pmatrix} x_0 \\ y_0 \\ 1 \end{pmatrix}$$

$$= \begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$

$$\begin{pmatrix} s & 0 & 0 \\ 0 & s & 0 \\ 0 & 0 & 1 \end{pmatrix} \begin{pmatrix} x_0 \\ y_0 \\ 1 \end{pmatrix}$$

Solving the component parameters ($\sin\theta$, e, b, s, h, and v) in Expression (12) in common equation form yields the following.

if $\theta = 0 (b_1 = 0)$     (13)
$\sin\theta = 0$
$s = -a_2 s = a_1$
$b = \dfrac{a_2}{s} = \dfrac{a_2}{a_1}$
$e = \dfrac{b_2}{s} = \dfrac{b_2}{a_1}$
$v = \dfrac{b_0}{e} = \dfrac{a_1 b_0}{b_2}$
$h = a_0 - bv = a_0 - \dfrac{a_2 b_0}{b_2}$ if $\theta = \dfrac{\pi}{2}(b_2 = 0, b_1 > 0)$     (14)
$\sin\theta = 1$
$s = -a_2$
$b = \dfrac{a_1}{s} = -\dfrac{a_1}{a_2}$
$e = \dfrac{b_1}{sp} = -\dfrac{b_1}{a_2}$
$v = \dfrac{b_0}{e} = -\dfrac{a_2 b_0}{b_1}$
$h = a_0 - bv = a_0 - \dfrac{a_1}{b_1}$ if $\theta = -\dfrac{\pi}{2}(b_2 = 0, b_1 < 0)$     (15)
$\sin\theta = -1$
$s = a_2$
$b = -\dfrac{a_1}{s} = -\dfrac{a_1}{a_2}$
$e = -\dfrac{b_1}{s} = -\dfrac{b_1}{a_2}$
$v = \dfrac{b_0}{e} = -\dfrac{a_2 b_0}{b_1}$
$h = a_0 - bv = a_0 - \dfrac{a_1}{b_1}$ otherwise $\left(-\dfrac{\pi}{2} < \theta < \dfrac{\pi}{2}\right)$ $\tan\theta = \dfrac{b_1}{b_2 p}$ if $b_1 > 0, \tan\theta > 0$ or $b_1 < 0, \tan\theta < 0$     (16)
$\sin\theta = \dfrac{\tan\theta}{\sqrt{1+\tan^2\theta}}, \cos\theta = \dfrac{1}{\sqrt{1+\tan^2\theta}}$
if $b_1 < 0, \tan\theta > 0$ or $b_1 > 0, \tan\theta < 0$
$\sin\theta = \dfrac{-\tan\theta}{\sqrt{1+\tan^2\theta}}, \cos\theta = \dfrac{1}{\sqrt{1+\tan^2\theta}}$
$b = \dfrac{a_1 \sin\theta + a_2 \cos\theta}{a_1 \cos\theta - a_2 \sin\theta}$
$s = \dfrac{a_1}{\cos\theta + b\sin\theta}$
$e = \dfrac{b_1}{\sin\theta}$
$v = \dfrac{b_0}{e}$
$h = a_0 - bv$ Thus, the component separation processing unit 23 models the global motion vector GMV expressed as an affine transform matrix by substituting into a component separation expression wherein the focal plane distortion component CF and camera motion component CM are expressed in a separated manner, using unknown component parameters. The component separation processing unit 23 then solves equations to calculate each of the parameters, thereby separating the global motion vector GMV into the focal plane distortion component CF and camera motion component CM. Note that the component separation processing unit 23 may supply to the separated component storage buffer 24 just the component parameters as the focal plane distortion component CF and camera motion component CM, or may supply all values included in the matrices. This holds true for other processing as well.

Next, a component calculation processing procedure RT1 executed in accordance with the image processing program will be described with reference to the flowchart shown in FIG. 14. Note that the component calculation processing procedure RT1 corresponds to the above-described motion detection processing and component separation processing.

First, upon frame image data being supplied, the motion detection unit 22 of the image processing unit 13 starts the component calculation processing procedure RT1, and the flow advances to step SP1.

In step SP1, upon detecting a global motion vector GMV representing the motion of the entire frame image, the motion detection unit 22 supplies the global motion vector GMV to the component separation processing unit 23, and the flow advances to the subsequent step SP2.

In step SP2, the component separation processing unit 23 of the image processing unit 13 models the global motion vector GMV supplied from the motion detection unit 22 by substituting into the component separation expression shown in Expression (11), and the flow advances to the subsequent step SP3.

In step SP3, the component separation processing unit 23 calculates the unknown component parameters which the component separation expression has, thereby calculating the camera motion component CM and focal plane distortion component CF, upon which the flow advances to the end step and the component calculation processing procedure RT1 ends.

1-4. Filtering Processing

The filtering processing unit 25 performs filtering of the camera motion component CM and focal plane distortion component CF based on the reliability information generated by the motion detection unit 22. As described above, the reliability information is made up of reliability indices of the local motion vectors LMV. The filtering processing unit 25 determines whether or not the reliability indices are each at a predetermined high-reliability threshold or higher, and calculates the ratio of reliability indices at the high-reliability threshold or higher as to the total number of reliability indices for each frame image data.

In the event that the ratio of reliability indices at the high-reliability threshold or higher exceeds a predetermined filtering threshold, this means that the reliability of the global motion vector GMV is high, so the filtering processing unit 25 uses the camera motion component CM and focal plane distortion component CF corresponding to the global motion vector GMV as they are. On the other hand, in the event that the ratio of reliability indices at the high-reliability threshold or higher does not exceed the predetermined filtering threshold, this means that the reliability of the global motion vector GMV is low, so the filtering processing unit 25 does not use the camera motion component CM and focal plane distortion component CF corresponding to the global motion vector GMV as they are.

Specifically, In the event that the reliability of the global motion vector GMV is high, the filtering processing unit 25 supplies the focal plane distortion component CF to the FP distortion correction amount calculation unit 26 as it is, and also supplies the camera motion component CM to the FP distortion correction amount calculation unit 26, camerawork amount calculation unit 27, and correction vector generating unit 29.

On the other hand, in the event that the reliability of the global motion vector GMV is low, the filtering processing unit 25 discards the supplied camera motion component CM and focal plane distortion component CF. In this case, the filtering processing unit 25 supplies a predetermined unit matrix to the FP distortion correction amount calculation unit 26 as the focal plane distortion component CF, and also supplies a predetermined unit matrix to the FP distortion correction amount calculation unit 26, camerawork amount calculation unit 27, and correction vector generating unit 29, as the camera motion component CM. Note that an arrangement may be made wherein the filtering processing unit 25 sets multiple filtering thresholds in accordance with reliability for example, such that one of the camera motion component CM and focal plane distortion component CF can be replaced with the unit matrix, or replacement with unit matrices is performed in increments of elements.

Thus, the filtering processing unit 25 selectively uses the focal plane distortion component CF and camera motion component CM generated based on a global motion vector GMV with high reliability. Accordingly, the image processing unit 13 supplies only global motion vectors GMV with high reliability and regarding which the probability of having little error is low, to the FP distortion correction amount calculation unit 26, camerawork amount calculation unit 27, and correction vector generating unit 29.

Next, a filtering processing procedure RT2 executed in accordance with the image processing program will be described with reference to the flowchart shown in FIG. 15.

Upon the reliability information, camera motion component CM, and focal plane distortion component CF being supplied from the separated component storage buffer 24, the filtering processing unit 25 of the image processing unit 13 starts the filtering processing procedure RT2, and the flow advances to step SP11.

In step SP11, the filtering processing unit 25 determines whether or not the reliability of the global motion vector GMV is high, based on the reliability information. In the event that a positive result is obtained here, this means that the camera motion component CM and focal plane distortion component CF are reliable. In this case, the filtering processing unit 25 advances the flow to the subsequent step SP12.

In step SP12, the filtering processing unit 25 outputs the camera motion component CM and focal plane distortion component CF separated by the component separation processing unit 23 as they are, advances the flow to the end step, and thus ends the filtering processing procedure RT2.

On the other hand, in the event that a negative result is obtained in step ST11, this means that the camera motion component CM and focal plane distortion component CF are not reliable. In this case, the filtering processing unit 25 advances the flow to the subsequent step SP13.

In step SP13, the filtering processing unit 25 discards the camera motion component CM and focal plane distortion component CF and replaces these with unit matrices, and outputs the replaced matrices as the camera motion component CM and focal plane distortion component CF. The filtering processing unit 25 then advances the flow to the end step and thus ends the filtering processing procedure RT2.

1-5. FP Distortion Correction Calculation Processing

It should be understood that focal plane distortion is not a phenomenon occurring independently in each frame image, but rather is a manifestation of distortion accumulated by having occurred continuously over multiple frame images. On the other hand, the global motion vector GMV represents motion as to the previous frame image. That is to say, the focal plane distortion component CF represents the amount of change, whether it be increase or decrease, of focal plane distortion as to the previous frame image. Accordingly, it would be desirable to use an accumulated value of the focal plane distortion component CF for accurate correction of the focal plane distortion.

Figure 16A:
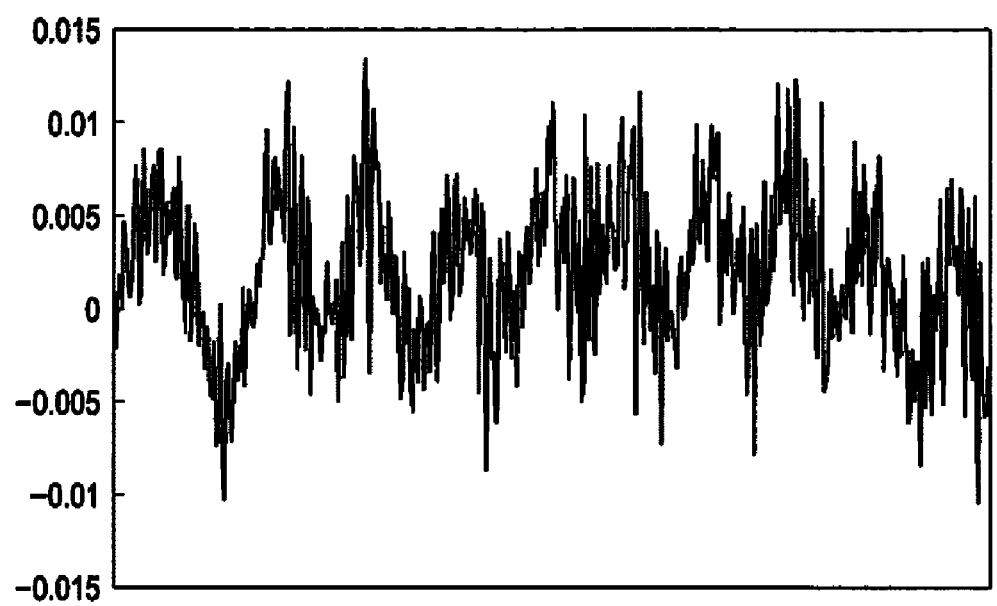
FIGS. 16A and 16B are schematic diagrams, FIG. 16A illustrating focal plane distortion component, and FIG. 16B illustrating an accumulation value thereof.

However, the focal plane distortion component CF includes error. FIG. 16A illustrates the way in which the focal plane distortion component CF changes in the event that focal plane distortion occurs in rapid repetition, due to camera shaking or the like. A positive sign for the value of the focal plane distortion component CF indicates that the focal plane distortion is increasing, and a negative sign for the value of the focal plane distortion component CF means that the focal plane distortion is decreasing.

Figure 16B:
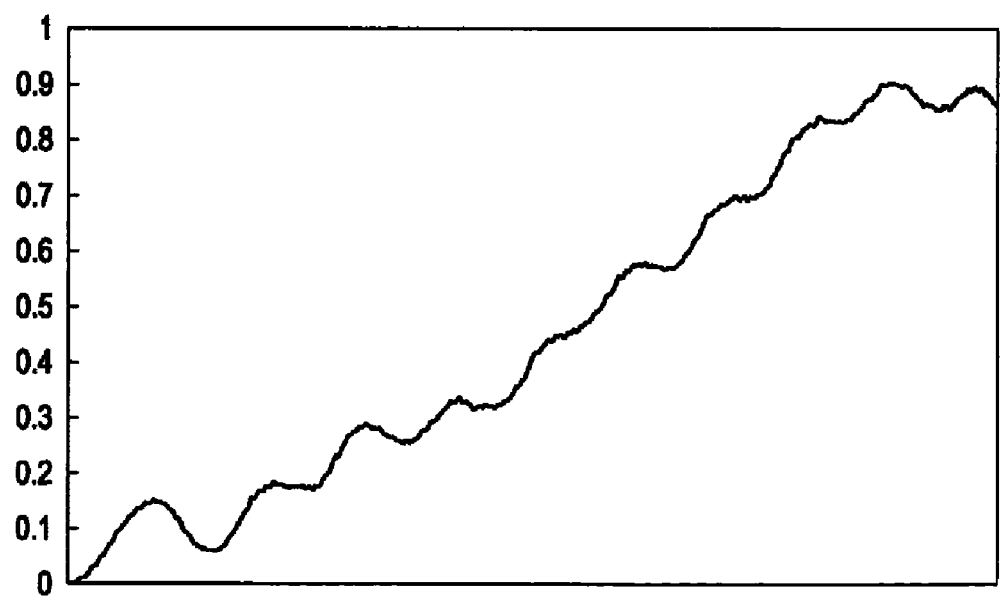

FIG. 16B shows an FP distortion accumulation value which is an accumulated value of the focal plane distortion component CF shown in FIG. 16A. As can be seen here, the FP distortion accumulation value markedly increases as the number of frame images increases. This is due to error which the focal plane distortion component CF includes having scattered. That is to say, in the event of performing frame image correction using the accumulated value of focal plane distortion component CF, the accumulation of error may lead to breakdown of the frame image.

Accordingly, the FP distortion correction amount calculation unit 26 of the image processing unit 13 calculates the FP distortion correction amount CFc such that the focal plane distortion is equivalent to that of the processing frame image, the frame image before the processing frame image, and the frame image following the processing frame image, of which the focal plane distortion is the smallest.

Now, the camera motion component CM has little error and high reliability as compared to the focal plane distortion component CF. Also, the focal plane distortion component CF has correlation with the translational speed of the camera motion component CM. Accordingly, the FP distortion correction amount calculation unit 26 calculates the FP distortion correction amount CFc based on the translational speed.

Note that the FP distortion correction amount CFc is expressed as a matrix wherein, of the focal plane distortion component CF in Expression (1), the FP distortion component parameter e is replaced with $e_c$, and the FP distortion component parameter b is replaced with $b_c$. In the later-described correction vector generating processing, an inverse matrix of the FP distortion correction amount CFc is multiplied, thereby correcting the focal plane distortion in the processing frame image.

Figure 17:
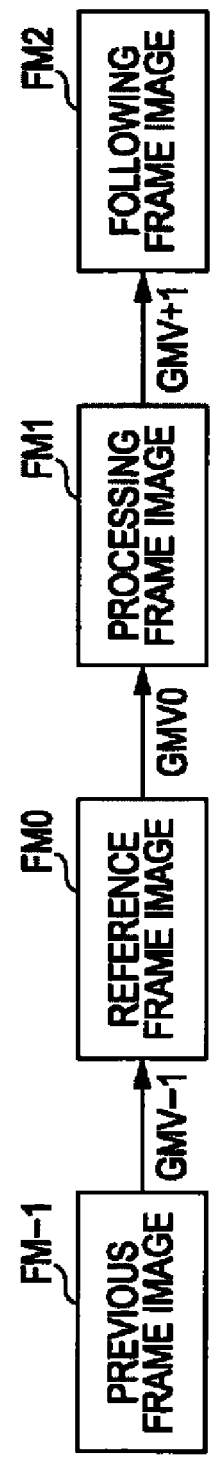
FIG. 17 is a schematic diagram for describing the relation between frame images and motion vectors.

As shown in FIG. 17, a frame image one previous to a processing frame image FM1 is called a reference frame FM0, and a frame image one previous to the reference frame FM0 is called a previous frame image FM−1. A frame image following the processing frame image FM1 is called a following frame FM2.

Also, the motion of the processing frame image FM1 with the reference frame FM0 as a reference is represented by what is called a global motion vector GMV0. The motion of the reference frame FM0 with the previous frame image FM−1 as a reference is represented by what is called a global motion vector GMV−1. The motion of the following frame FM2 with the processing frame image FM1 as a reference is represented by what is called a global motion vector GMV+1. These are collectively referred to as "global motion vector GMV".

The camera motion component CM and focal plane distortion component CF corresponding to the global motion vectors GMV are sequentially supplied to the FP distortion correction amount calculation unit 26. Note that the camera motion component CM corresponding to the global motion vectors GMV0, GMV+1, and GMV−1, are respectively called camera motion components CM0, CM+1, and CM−1. Also, the focal plane distortion component CF corresponding to the global motion vectors GMV0, GMV+1, and GMV−1, are respectively called focal plane distortion components CF0, CF+1, and CF−1.

The FP distortion correction amount calculation unit 26 compares the values of the motion component parameter v in the camera motion components CM0, CM+1, and CM−1. The motion component parameter v represents translational speed in the vertical direction. In the event that the translation speed in the vertical direction is great, focal plane distortion is great, and in the event that the translation speed in the vertical direction is small, focal plane distortion is small. Of the camera motion components CM0, CM+1, and CM−1, the FP distortion correction amount calculation unit 26 selects the camera motion component CM with the smallest translational speed in the vertical direction (i.e., the smallest motion component parameter v value).

In the event that the selected camera motion component CM is the camera motion component CM0, the FP distortion correction amount calculation unit 26 sets the focal plane distortion so as to be around the same as that of the processing frame image FM1. The FP distortion correction amount calculation unit 26 sets a unit matrix as the FP distortion correction amount CFc, and sets "1" to a FP distortion component parameter $e_c$ which represents enlargement/reduction in the vertical direction. As a result, focal plane distortion is not corrected regarding the enlargement/reduction in the vertical direction.

On the other hand, in the event that the selected camera motion component CM is the camera motion component CM−1, the FP distortion correction amount calculation unit 26 sets the focal plane distortion so as to be around the same as that of the reference frame image FM0. The FP distortion correction amount calculation unit 26 sets the focal plane distortion component CF0 as the FP distortion correction amount CFc, and sets "e" in the focal plane distortion component CF0 to the FP distortion component parameter $e_c$. As a result, focal plane distortion is corrected regarding the enlargement/reduction in the vertical direction, to a level around that of the reference frame FM0.

Again yet, the event that the selected camera motion component CM is the camera motion component CM+1, the FP distortion correction amount calculation unit 26 sets the focal plane distortion so as to be around the same as that of the processing frame image FM2. The FP distortion correction amount calculation unit 26 sets an inverse matrix of the focal plane distortion component CF+1 as the FP distortion correction amount CFc, and sets "reciprocal of e" in the focal plane distortion component CF+1 to the FP distortion component parameter $e_c$. As a result, focal plane distortion is corrected regarding the enlargement/reduction in the vertical direction, to a level around that of the following frame FM2.

The FP distortion correction amount calculation unit 26 compares the value of a motion component parameter h in the camera motion components CM0, CM+1, and CM−1 in the same way, and selects the camera motion component CM with the smallest horizontal direction translational speed (i.e., the smallest motion component parameter h value). The FP distortion correction amount calculation unit 26 then selects an appropriate FP distortion component parameter $b_c$ from "0", "b" in the focal plane distortion component CF0, and "reciprocal of b" in the focal plane distortion component CF+1, in accordance with the selected camera motion component CM0, CM−1, or CM+1. The FP distortion correction amount calculation unit 26 further takes the selected FP distortion component parameter $e_c$ and $b_c$ as the FP distortion correction amount CFc, and supplies to the correction vector generating unit 29.

Figure 18A:
FIGS. 18A and 18B are schematic diagrams for describing adjustment of focal plane distortion component.
Figure 18B:
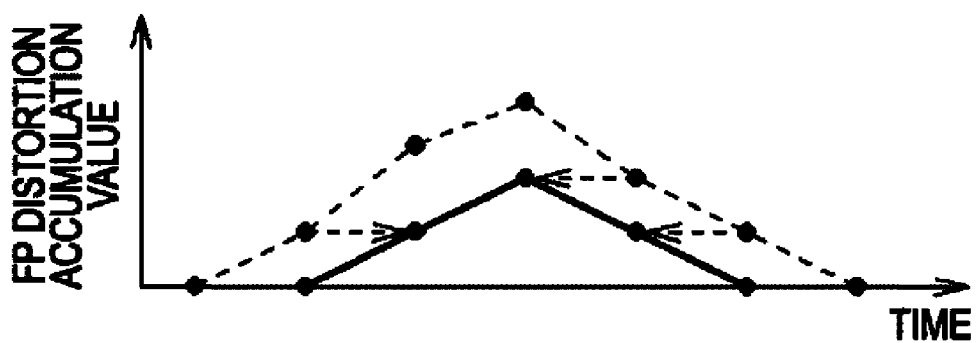

Accordingly, the FP distortion correction amount calculation unit 26 does not accumulate the focal plane distortion component CF, so the FP distortion correction amount CFc does not scatter. Also, as shown in FIG. 18B, while the FP distortion correction amount calculation unit 26 does not correct all focal plane distortion (FIG. 18A), the focal plane distortion can be reduced to below the FP distortion accumulation value, thereby reducing focal plane distortion.

This focal plane distortion has been confirmed to be of a nature wherein increase and decrease occurs over a short period of around five frames for example, with signs changing, and the maximum value is not extremely great. Accordingly, the FP distortion correction amount calculation unit 26 can make focal plane distortion in the frame image visually inconspicuous simply by reducing the maximum amount of focal plane distortion.

In this way, the FP distortion correction amount calculation unit 26 selects, of the processing frame image FM1, the reference frame FM0, and the following frame FM2, the frame image FM with the smallest focal plane distortion, based on translational speed. The FP distortion correction amount calculation unit 26 then calculates the FP distortion correction amount CFc so as to be the same level as the selected frame image FM. Thus, the FP distortion correction amount calculation unit 26 prevents scattering of the FP distortion correction amount CFc in a sure manner, and also reduces focal plane distortion so as to be less conspicuous visually.

Figure 19:
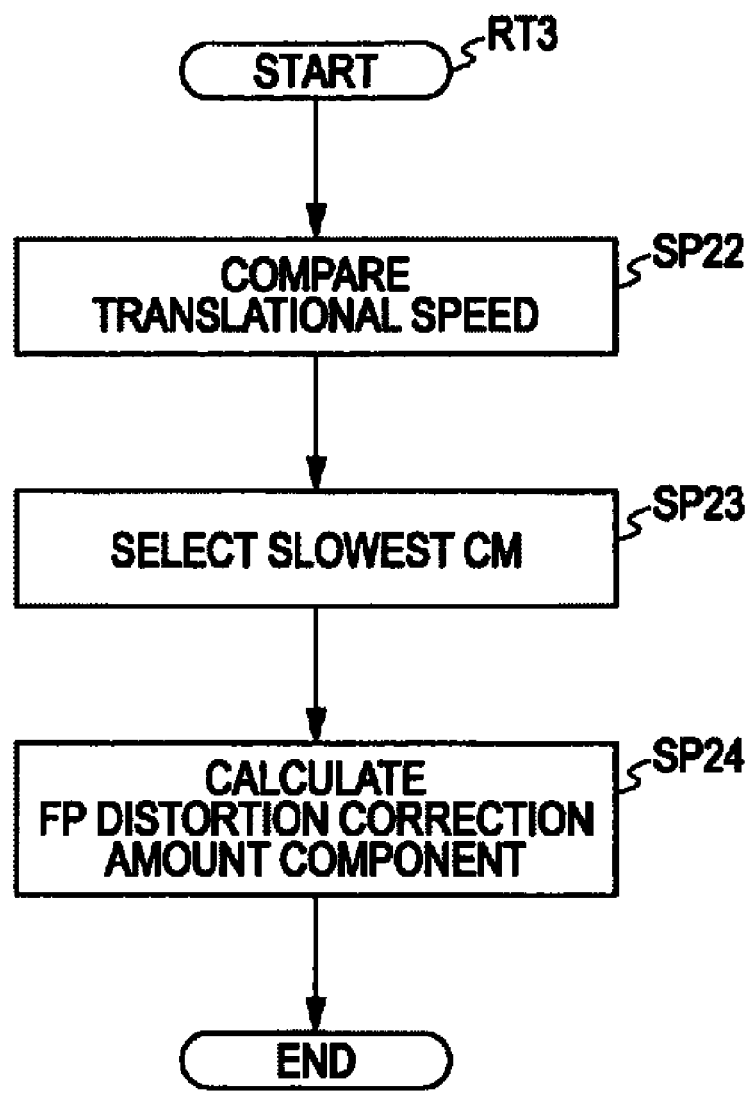
FIG. 19 is a flowchart for describing FP distortion correction amount calculation processing procedures according to the first embodiment.

Next, an FP distortion correction amount calculation processing procedure RT3 executed in accordance with the image processing program will be described with reference to the flowchart shown in FIG. 19.

Upon a global motion vector GMV being supplied, the FP distortion correction amount calculation unit 26 starts the FP distortion correction amount calculation processing procedure RT3, and advances the flow to step SP22.

In step SP22, the FP distortion correction amount calculation unit 26 compares the values of the motion component parameters h and v in the camera motion components CM0, CM+1, and CM−1, and then advances the flow to the subsequent step SP23.

In step SP23, the FP distortion correction amount calculation unit 26 selects the camera motion component CM with the smallest translational speed (i.e., the smallest value of motion component parameters h and v), and then advances the flow to the subsequent step SP24.

In step SP24, the FP distortion correction amount calculation unit 26 calculates the FP distortion correction amount CFc in accordance with the camera motion component CM selected in step SP23. At this time, the FP distortion correction amount calculation unit 26 calculates the FP distortion correction amount CFc so that the focal plane distortion is around the same level as that of the frame image corresponding to the relevant camera motion component CM. The FP distortion correction amount calculation unit 26 advances the flow to the end step, so as to end the FP distortion correction amount calculation processing procedure RT3.

1-6. Calculation of Camerawork Amount

The camerawork amount calculation unit 27 applies a LPF (Low-Pass Filter) of a predetermined number of taps to the motion component parameters θ, s, h, and v, supplied from the filtering processing unit 25, thereby calculating camerawork amount, which is motion which the user has intended.

Specifically, component parameters of a number equivalent to the number of taps are obtained, and applied to a FIR (Finite Impulse Response Filter), thereby obtaining motion component parameters following filtering (also called camerawork component parameters). The camerawork component parameters represent the amount of camerawork. Hereinafter, the camerawork component parameters will be written as $\theta_f$, $s_f$, $h_f$, and $v_f$.

The number of taps of the LPF is set such that the properties are sufficient for an LPF. A cutoff frequency is set with the LPF so that the range around a frequency which can be deemed to be camera shaking can be cut out in a sure manner. Also note that a simple moving average filter may be used.

Figure 20A:
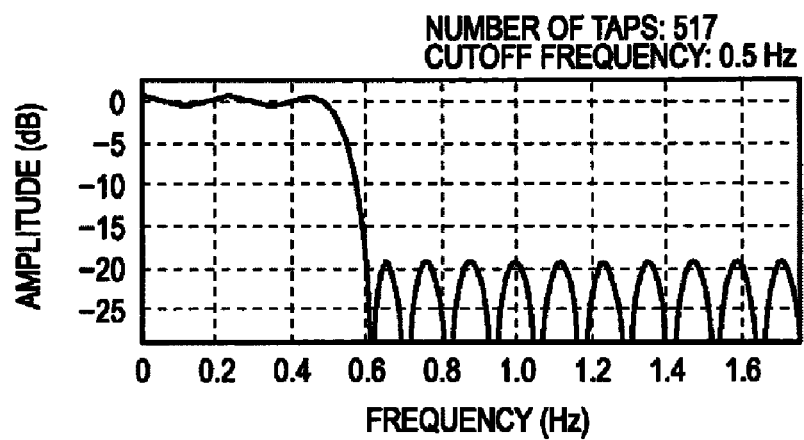
FIGS. 20A and 20B are schematic diagrams for describing LPF properties.
Figure 20B:
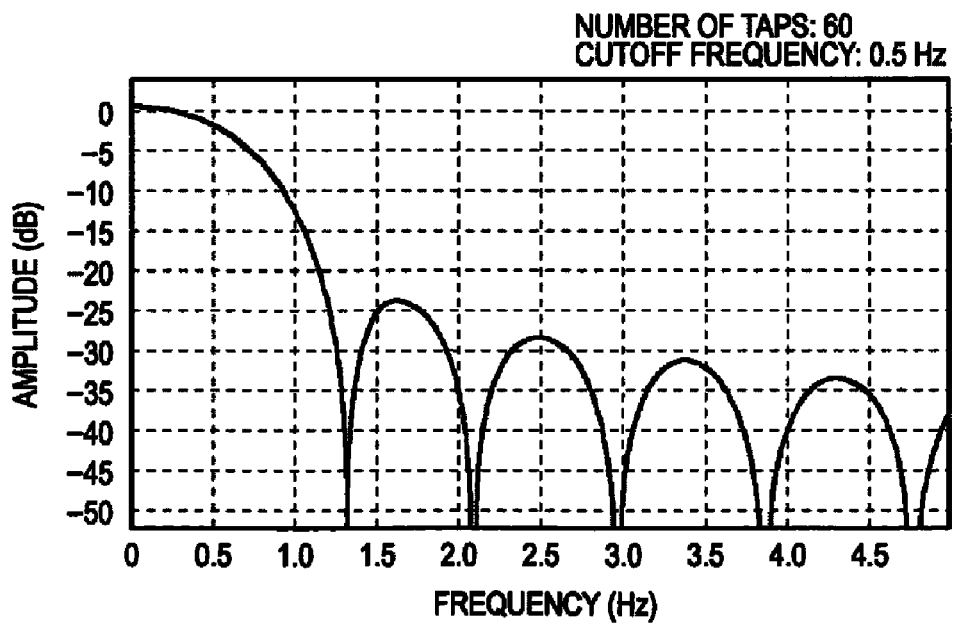

In the event that the cutoff frequency is set to 0.5 Hz, the LPF can be made to have high precision by setting the number of taps to around 517, as shown in FIG. 20A. Also, as shown in FIG. 20B, even if the number of taps is dropped to around 60, the LPF will function to a certain extent even though precision is lower. Accordingly, the camerawork amount calculation unit 27 is preferably set based on actual implementation restrictions, such as processing capabilities of the hardware of the image processing unit 13, tolerance range for output delay, and so forth.

Thus, the camerawork amount calculation unit 27 subjects the motion component parameters θ, s, h, and v, which represent the amount of camera motion, to LPF processing, thereby generating the camerawork component parameters $\theta_f$, $s_f$, $h_f$, and $v_f$, which represent the amount of camerawork.

1-7. Generating a Correction Vector

The correction vector generating unit 29 is arranged to generate a correction vector Vc to be applied to the processing frame image, so as to correct camera shaking and focal plane distortion.

For the sake of ease of description, we will write the components and matrices in the component separation expression as in Expression (17), whereby we can express the component separation expression of Expression (11) as in Expression (18). Note that the coordinates before transform $X_0$ are coordinates corresponding to the reference frame FM0, and the coordinates after transform $X_1$ are coordinates corresponding to the processing frame image FM1.

$$X_0 \text{(coordinates before transform)} = \begin{pmatrix} x_0 \\ y_0 \\ 1 \end{pmatrix} \quad (17)$$

$$X_1 \text{(coordinates after transform)} = \begin{pmatrix} x_1 \\ y_1 \\ 1 \end{pmatrix}$$

$$F(FP \text{ distortion correction amount } CFc) = \begin{pmatrix} 1 & 0 & 0 \\ 0 & e_c & 0 \\ 0 & 0 & 1 \end{pmatrix} \begin{pmatrix} 1 & b_c & 0 \\ 0 & 1 & 0 \\ 0 & 0 & 1 \end{pmatrix}$$

$$M(\text{camera motion component } CM) = \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} s & 0 & 0 \\ 0 & s & 0 \\ 0 & 0 & 1 \end{pmatrix}$$

$$P(\text{aspect ratio correction matrix } MP1) = \begin{pmatrix} \frac{1}{p} & 0 & 0 \\ 0 & 1 & 0 \\ 0 & 0 & 1 \end{pmatrix}$$

$$C(\text{origin correction matrix } MC1) = \begin{pmatrix} 1 & 0 & h_c \\ 0 & 1 & v_c \\ 0 & 0 & 1 \end{pmatrix}$$

$$X_1 = C^{-1} P^{-1} FMPCX_0 \quad (18)$$

Now, with the amount of shaking as $M_S$ and the amount of camerawork as $M_C$, the following Expression (19) holds.

$$M = M_S M_C \quad (19)$$

The amount of shaking as $M_S$ can be calculated by subtracting the camerawork component parameter from the motion component parameter in the camera motion component CM(M). The correction vector generating unit 29 calculates the amount of shaking as $M_S$ from the motion component parameters θ, s, h, and v, and camerawork component parameters $θ_f$, $s_f$, $h_f$, and $v_f$, supplied from the camerawork amount calculation unit 27 following Expression (20).

$$M_c = \begin{pmatrix} 1 & 0 & h_f \\ 0 & 1 & v_f \\ 0 & 0 & 1 \end{pmatrix} \begin{pmatrix} \cos θ_f & -\sin θ_f & 0 \\ \sin θ_f & \cos θ_f & 0 \\ 0 & 0 & 1 \end{pmatrix} \begin{pmatrix} s_f & 0 & 0 \\ 0 & s_f & 0 \\ 0 & 0 & 1 \end{pmatrix} \quad (20)$$

$$M_s = MM_c^{-1}$$

Substituting Expression (19) into Expression (18) and modifying yields Expression (21).

$$X_1 = C^{-1} P^{-1} F M_S M_C P C X_0 = (C^{-1} P^{-1} F M_S P_C)(C^{-1} P^{-1} M_C P C) X_1 \quad (21)$$

Further modifying Expression (21) yields Expression (22).

$$C^{-1} P^{-1} M_C P C X_0 = C^{-1} P^{-1} M_S^{-1} F^{-1} P C X_1 \quad (22)$$

Thus, it can be seen from Expression (22) that the left side where the amount of camerawork $M_C$ alone is applied to the coordinates before transform $X_0$ is equal to the right side where an inverse matrix of the amount of shaking as $M_S$ and focal plane distortion component CF(F) are applied to the coordinates after transform $X_1$.

In other words, multiplying the coordinates after transform $X_1$ by the correction vector Vc shown in Expression (23) yields coordinates where only the amount of camerawork $M_C$ from the reference frame FM0 is applied (i.e., where shaking and FP distortion correction amount CFc have been cancelled out).

$$Vc = C^{-1} P^{-1} M_S F^{-1} PC \quad (23)$$

Accordingly, upon the motion component parameters θ, s, h, and v, camerawork component parameters $θ_f$, $s_f$, $h_f$, and $v_f$, and FP distortion component parameter $e_c$ and $b_c$ being supplied, the correction vector generating unit 29 generates a correction vector Vc in accordance with Expression (20) and Expression (23), which is supplied to the motion compensation unit 30.

Consequently, the correction vector Vc is applied at the motion compensation unit 30, whereby the shaking and focal plane distortion at the processing frame image FM1 are corrected. Thus, the correction vector generating unit 29 can generate a processing frame image FM1 in a state where only the amount of camerawork $M_C$ is applied as compared to the reference frame FM0, due to the shaking and focal plane distortion having been corrected.

Figure 21:
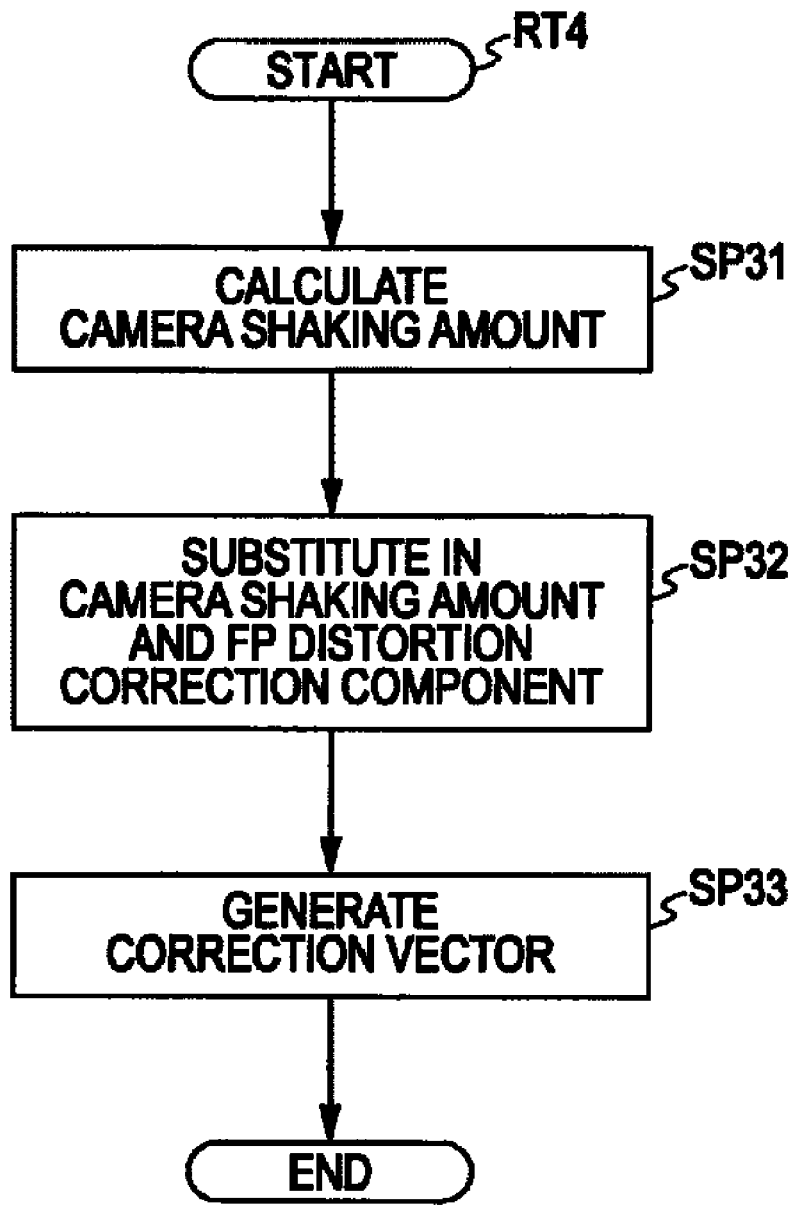
FIG. 21 is a flowchart for describing correction vector generating processing procedures.

Next, a correction vector generating processing procedure RT4 executed in accordance with the image processing program will be described with reference to the flowchart shown in FIG. 21.

Upon receiving supply of the camera motion component CM, camerawork component CMc, and FP distortion correction amount CFc, the correction vector generating unit starts the correction vector generating processing procedure RT4, and advances the flow to step SP31.

In step SP31, the correction vector generating unit 29 calculates the amount of shaking as $M_S$ based on the camera motion component CM and camerawork component CMc, following Expression (20), following which the flow advances to step SP32.

In step S32, the correction vector generating unit 29 substitutes an inverse matrix of the amount of shaking as $M_S$, i.e., $M_S^{-1}$, and an inverse matrix of the FP distortion correction amount CFc i.e., $F^{-1}$, into Expression (23), following which the flow advances to step SP33.

In step SP33, the correction vector generating unit 29 generates the correction vector Vc following the Expression (23), and then advances the flow to the end step, so as to end the correction vector generating processing procedure RT4.

Note that the above-described series of image processing can be executed by hardware or by software. In the event of carrying out the image processing by software, the image processing unit 13 is formed in a virtual manner in the CPU and RAM, and image processing is executed by loading the image processing program stored in ROM to the RAM.

1-8. Operations and Advantages

With the above configuration, the image processing unit 13 of the image processing terminal 10 detects the global motion vector GMV which is a motion vector representing the motion of the entire frame image from frame image data of a frame image. The image processing unit 13 uses unknown component parameters θ, s, h, v, e, and b, which represent camera motion which is motion of the camera and amount of change in focal plane distortion, thereby modeling the detected global motion vector GMV to the component separation expression (Expression (11)). Consequently, the camera motion component CM and focal plane distortion component CF can be expressed in a separated manner with component separation.

The image processing unit 13 calculates the component parameters e and b used in the component separation expression to calculate the focal plane distortion component CF in the global motion vector GMV. Thus, the image processing unit 13 can fictitiously presume that the global motion vector GMV is configured only of the camera motion component CM and focal plane distortion component CF. Accordingly, the image processing unit 13 can calculate the focal plane distortion component CF in the global motion vector GMV with simple processing.

The image processing unit 13 corrects the focal plane distortion which the frame image has, based on the calculated focal plane distortion component CF. Accordingly, the image processing unit 13 can reduce the focal plane distortion in the frame image.

With the image processing unit 13, the focal plane distortion component CF is expressed as FP distortion parallelogram element EFb and FP distortion vertical direction enlargement/reduction element EFa. Accordingly, the image processing unit 13 can appropriately model two types of focal plane distortion which are manifested as distortion in parallelogram shape and enlargement/reduction in the vertical direction, and thus can calculate the focal plane distortion component CF with high precision.

The image processing unit 13 calculates the FP distortion correction amount CFc representing the amount of correction of focal plane distortion as to the frame image, based on the calculated focal plane distortion component CF. The image processing unit 13 also generates a correction vector Vc for correcting the focal plane distortion in the global motion vector GMV, based on the calculated FP distortion correction amount CFc. The image processing unit 13 further applies the generated correction vector Vc to, out of the frame images, the processing frame image FM1 which is to be processed. Accordingly, the image processing unit 13 can correct the focal plane distortion in the processing frame image FM1 by an amount equivalent to the calculated FP distortion correction amount CFc, and thus can reduced the focal plane distortion in the processing frame image FM1.

The image processing unit 13 selects, from the processing frame image FM1, and the reference frame image FM0 and following frame FM2 which are the frame images immediately prior to and following the processing frame image FM1, the frame image with the smallest focal plane distortion. The image processing unit 13 calculates the FP distortion correction amount CFc such that the focal plane distortion is at the same level as the selected frame image. Accordingly, the image processing unit 13 can reduce the focal plane distortion without using a focal plane distortion accumulation value, thereby preventing frame image breakdown due to accumulation of error in focal plane distortion.

With the image processing unit 13, the camera motion component CM is represented by at least translational element EMa and enlargement/reduction element EMc, and selects the frame image with the smallest focal plane distortion based on the translational element EMa. Accordingly, the image processing unit 13 can select the frame image with the smallest focal plane distortion by using the translational element EMa which is more reliable that the FP distortion parameters b and e and also has correlation with the focal plane distortion. Consequently, the image processing unit 13 can select the frame image with the smallest focal plane distortion in a sure manner, without erroneously selecting incorrect frame images.

With the image processing unit 13, the translational element EMa is represented by vertical direction translational speed v and horizontal direction translational speed h, and the focal plane distortion correction amount CFc corresponding to the FP distortion vertical direction enlargement/reduction element EFa based on the vertical direction translational speed v. Also, the image processing unit 13 calculates the focal plane distortion correction amount CFc corresponding to the FP distortion parallelogram element EFb based on the horizontal direction translational speed h.

With the image processing unit 13, the component separation expression (Expression (11)) is expressed as a matrix expression. Accordingly the image processing unit 13 can readily model the camera motion component CM and focal plane distortion component CF.

At the time of detecting the global motion vector GMV, the image processing unit 13 generates reliability information representing the reliability of the global motion vector GMV. The image processing unit 13 further generates the focal plane distortion correction amount CFc using only the focal plane distortion component CF of global motion vectors GMV regarding which the reliability is high, based on the reliability information. Accordingly, the image processing unit 13 can generate the focal plane distortion correction amount CFc using only focal plane distortion component CF with little error, whereby calculation prediction of the focal plane distortion correction amount CFc can be improved.

With the image processing unit 13, the camera motion component CM is expressed as translational element EMa, enlargement/reduction element EMc, and rotational element EMb in one direction. Accordingly, the image processing unit 13 can handle the component separation expression as affine transform, thereby markedly reducing processing load.

With the image processing unit 13, the expression is multiplied by an origin correction matrix MC1 for moving the origin to the center, and an aspect ratio correction matrix MP1 to change the aspect ratio of pixels to 1:1 before the rotational element EMb. Also, with the image processing unit 13, the expression is multiplied by an origin correction inverse matrix MC2 for returning the origin that had been moved to the center back to where it belongs, and an aspect ratio correction inverse matrix MP2 to return the aspect ratio of pixels to their original aspect ratio, after the rotational element EMb. Accordingly, the image processing unit 13 can perform rotational processing as to the frame image which has had the origin which is the center of rotation moved to the center, and the aspect ratio of pixels changed to 1:1. Thus, even in cases wherein the origin is at a position other than a center, and the aspect ratio of the pixels is not 1:1, the image processing unit 13 can suitably rotate the frame image.

With the component parameters as e and b, the image processing unit 13 models the focal plane distortion component CF as shown in Expression (1). Accordingly, the image processing unit 13 can appropriately model focal plane distortion which is manifested as vertical direction enlargement/reduction and parallelogram distortion.

With the component parameters as θ, h, v, and s, the image processing unit 13 models the camera motion component CM as shown in Expression (3). Accordingly, the image processing unit 13 can appropriately model the camera motion component CM as rotation in the roll direction, vertical and horizontal translational speed, and enlargement/reduction speed.

The image processing unit 13 models the global motion vector GMV as shown in Expression (11). Accordingly, the image processing unit 13 can model the global motion vector GMV as an affine transform expression including rotation in one direction alone and suitably separated from the camera motion component CM and focal plane distortion component CF, having resolved the problem of center of rotation and aspect ratio of pixels regarding rotation.

With the configuration described above, the image processing unit 13 models the global motion vector GMV to a component separation expression using unknown component parameters, assuming that the global motion vector GMV is configured on the most part from the camera motion component CM and focal plane distortion component CF. The image processing unit 13 calculates the component parameters, thereby calculating the focal plane distortion component CF. Accordingly, the image processing unit 13 can calculate the focal plane distortion component CF with easy processing, using an easy component separation expression.

2. Second Embodiment

The second embodiment is illustrated in FIGS. 22 through 26B, in which portions corresponding to those in the first embodiment illustrated in FIGS. 1 through 21 are denoted with the same reference numerals, and accordingly redundant description of such portions will be omitted here.

Figure 22:
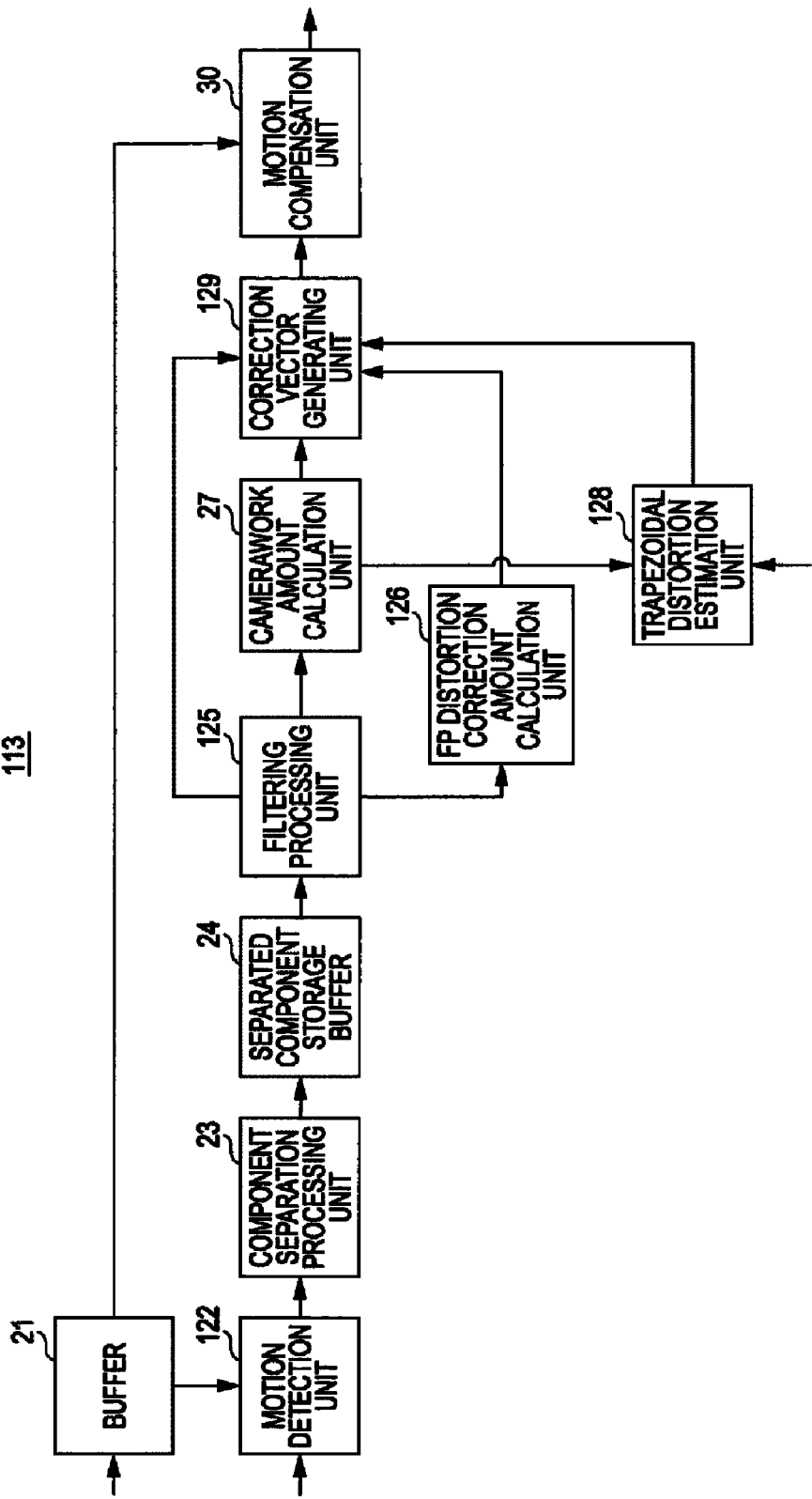
FIG. 22 is a schematic diagram illustrating the configuration of an image processing unit according to a second embodiment.

The second embodiment differs from the first embodiment in that, as shown in FIG. 22, an image processing unit 113 corresponding to the image processing unit 13 has a trapezoidal distortion estimation unit 128. Also, with the second embodiment, the contents of motion detection processing, FP distortion correction amount calculation processing, and correction vector generating processing, differ from those in the first embodiment.

2-1. Motion Detection Processing

A motion detection unit 122 corresponding to the motion detection unit 22 in the first embodiment generates local motion vectors LMV and also reliability indices for the local motion vectors LMV. In the event that the reliability indices are at above an employment threshold, the motion detection unit 122 uses the local motion vectors LMV to generate the global motion vector GMV. On the other hand, in the event that the reliability indices are below the employment threshold, the motion detection unit 122 does not uses the local motion vectors LMV. Accordingly, the motion detection unit 122 can generate global motion vectors GMV using only local motion vectors LMV with high reliability, thereby improving the precision of the global motion vector GMV. The motion detection unit 122 takes the ratio of used local motion vectors LMV as to the number of all local motion vectors LMV (i.e., the number of blocks in the frame image) as reliability information.

A filtering processing unit 125 performs filtering of the camera motion component CM and focal plane distortion component CF in the same way as with the first embodiment, depending on whether or not the reliability information exceeds the filtering threshold.

2-2. FP distortion Correction Amount Calculation Processing

A FP distortion correction amount calculation unit 126 which corresponds to the FP distortion correction amount calculation unit 26 takes the FP distortion accumulation value as the FP distortion correction amount CFc. In order to prevent scattering of the FP distortion accumulation value as described above using FIGS. 16A and 16B, the FP distortion correction amount calculation unit 126 evaluates the reliability of the focal plane distortion component CF, and also resets the FP distortion accumulation value in the event that the translation speed is low.

As described above, there is a correlation (rule) between the focal plane distortion component CF and the translational speed. The FP distortion correction amount calculation unit 126 compares the supplied camera motion component CM and focal plane distortion component CF, and evaluates the reliability of the focal plane distortion component CF based on whether or not a rule holds between the focal plane distortion component CF and translational speed.

The FP distortion correction amount calculation unit 126 determines whether or not the relation between the FP distortion component parameter and motion component parameter e, and the relation between the FP distortion component parameter b and motion component parameter h, each match the rule. The FP distortion correction amount calculation unit 126 holds relational information representing a range in which the FP distortion component parameters and motion component parameters match the rule, for example, in the form of relational expressions or tables representing the rule, stored beforehand. The FP distortion correction amount calculation unit 126 thus determines whether or not the relations of the distortion component parameters and motion component parameters fit this relational information, thereby determining whether or not these match the rule. In the event that the FP distortion component parameters and motion component parameters do not match the rule, the FP distortion correction amount calculation unit 126 reduces the effect of the FP distortion component parameters since the reliability thereof is low.

The FP distortion correction amount calculation unit 126 multiplies the focal plane distortion component CF by a coefficient which is smaller than 1, for example, thereby reducing the effects of FP distortion accumulation values of focal plane distortion components CF not matching the rule. Also, the FP distortion correction amount calculation unit 126 may be arranged to completely eliminate the effects of FP distortion accumulation values of focal plane distortion components CF not matching the rule by setting the focal plane distortion component CF to a unit matrix. Accordingly, the FP distortion correction amount calculation unit 126 can calculate the FP distortion accumulation value primarily on focal plane distortion components CF with high reliability, thereby reducing error in the FP distortion accumulation value, whereby scattering of the FP distortion accumulation value can be prevented.

Also, in the event that the motion component parameters h and v are smaller than a predetermined reset value, this means that none or very little focal plane distortion has occurred, so the FP distortion correction amount calculation unit 126 resets the FP distortion accumulation value to zero. As described above, the focal plane distortion component CF repeats increase and decrease in cycles of around five frames, with the sign inverting. The FP distortion correction amount calculation unit 126 can reset the FP distortion accumulation value generally regularly each time the signs of the motion component parameters h and v change, and accordingly can prevent the FP distortion accumulation value from scattering.

Also, the FP distortion correction amount calculation unit 126 can calculate the FP distortion accumulation value using just the FP distortion component parameters e and b which have high reliability, whereby error in the FP distortion accumulation value can be reduced, and the FP distortion accumulation value can be used as the FP distortion correction amount CFc. As a result, the FP distortion correction amount calculation unit 126 and suitably correct almost all focal plane distortion in the frame image.

Also, the FP distortion correction amount calculation unit 126 detects that the translational speed has become almost zero, and resets the FP distortion accumulation value. Accordingly, the FP distortion correction amount calculation unit 126 can suitably prevent scattering of the FP distortion accumulation value, so the FP distortion accumulation value can be used as the FP distortion correction amount CFc.

Figure 23:
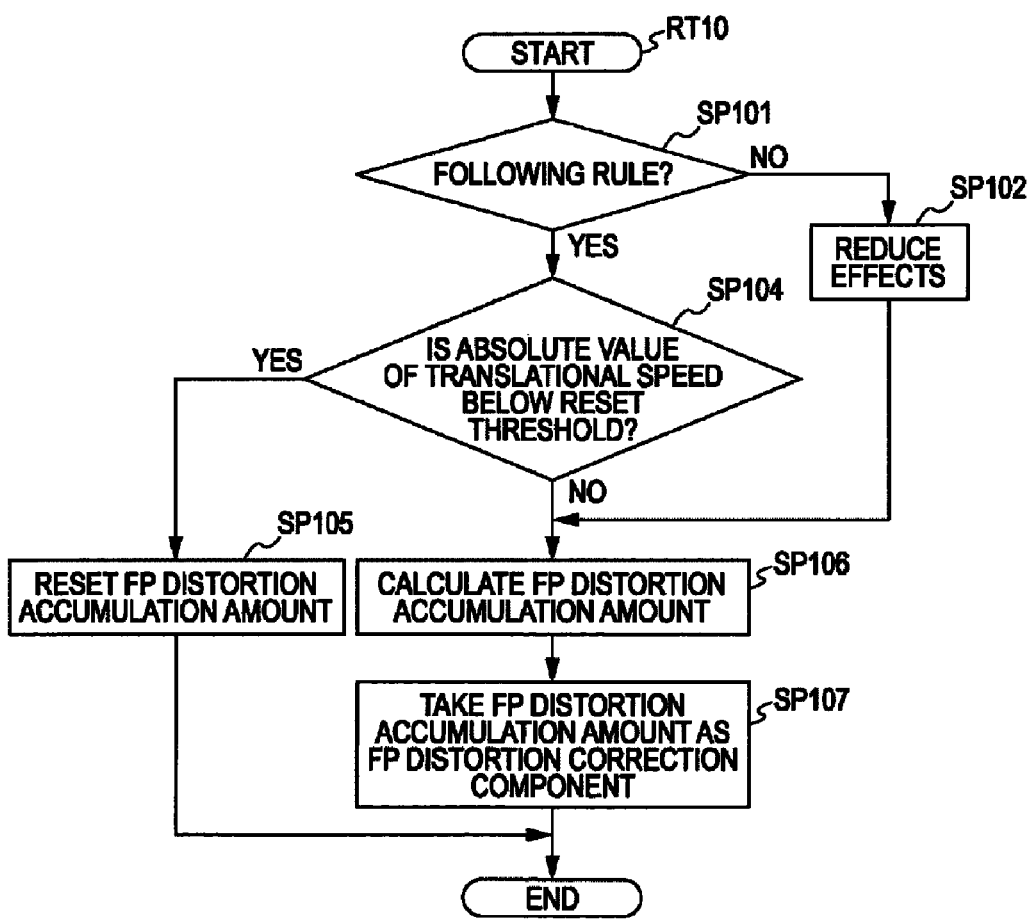
FIG. 23 is a flowchart for describing FP distortion correction amount calculation processing procedures according to the second embodiment.

Next, an FP distortion correction amount calculation processing procedure RT10 executed in accordance with the image processing program will be described with reference to the flowchart shown in FIG. 23. Upon the camera motion component CM and focal plane distortion component CF being supplied, the FP distortion correction amount calculation unit 126 starts the FP distortion correction amount calculation processing procedure RT10, and advances the flow to step SP101.

In step SP101, the FP distortion correction amount calculation unit 126 determines whether or not the relation between the focal plane distortion component CF and the translational speed of the camera motion component CM follows the rule (correlation). In the event that a negative result is obtained here, the focal plane distortion component CF is not reliable, so the FP distortion correction amount calculation unit 126 advances the flow to the subsequent step SP102.

In step SP102, the FP distortion correction amount calculation unit 126 reduces or eliminates the effects of the focal plane distortion component CF, and advances the flow to the subsequent step SP106.

On the other hand, in the event that a positive result is obtained in step SP101, this means that the focal plane distortion component CF is reliable, so the FP distortion correction amount calculation unit 126 advances the flow to the subsequent step SP104.

In step SP104, the FP distortion correction amount calculation unit 126 determines whether or not the translation speed of the camera motion component CM is below a reset threshold. In the event that a positive result is obtained here, this means that the focal plane distortion is zero or almost zero. In this case, the FP distortion correction amount calculation unit 126 advances the flow to the subsequent step SP105, resets the FP distortion accumulation value, advances to the end step, and ends the FP distortion correction amount calculation processing procedure RT10.

On the other hand, in the event that a negative result is obtained in step SP 104, this means that focal plane distortion has occurred, so the FP distortion correction amount calculation unit 126 advances the flow to the subsequent step SP106.

In step SP106, the FP distortion correction amount calculation unit 126 calculates the FP distortion accumulation value, and advances the flow to the subsequent step SP107. At this time, the FP distortion correction amount calculation unit 126 adds the focal plane distortion component CF or a focal plane distortion component with reduced effects, to the FP distortion accumulation value calculated in the previous processing frame image.

In step SP107, the FP distortion correction amount calculation unit 126 takes the FP distortion accumulation value calculated in step SP106 as the FP distortion correction amount CFc, advances to the end step, and ends the FP distortion correction amount calculation processing procedure RT10.

Note that the FP distortion correction amount calculation unit 126 executes FP distortion correction amount calculation processing for each of the translational speeds h and v, and takes the FP distortion accumulation values corresponding to each of the FP distortion component parameters e and b as FP distortion correction amount CFc, respectively.

2-3. Removal of Trapezoidal Distortion

As described above, angular change between the subject and the lens unit are suppressed in the yaw direction and pitch direction, due to the camera shaking correction function of the camcorder 1. However, the camcorder 1 does not completely cancel out this angular change, and also shaking in the vertical direction and horizontal direction is cancelled out by driving the lens unit 3 in the yaw direction and pitch direction. Accordingly, the frame image data includes yaw directional and pitch directional angular change. This angular change is manifested as trapezoidal distortion in the frame image.

Accordingly, the image processing unit 113 according to the present embodiment estimates the yaw directional and pitch directional angular change from the translational speed in the global motion vector GMV, and calculates a trapezoidal distortion amount A based on the angular change. The image processing unit 113 cancels out the trapezoidal distortion amount A from the processing frame image, thereby removing the effects of trapezoidal distortion from the frame image data.

2-3-1. Trapezoidal Distortion Estimation Processing

As shown in Expression (11), the component separation expression does not have yaw directional and pitch directional components. Thus, the yaw directional and pitch directional angular change have a correlation with the translational speed. Accordingly, the trapezoidal distortion estimation unit 128 of the image processing unit 113 performs trapezoidal distortion estimation processing in which the yaw directional and pitch directional angular change is estimated for the motion component parameters h and v, and the amount of trapezoidal distortion due to this angular change is calculated.

Now, the trapezoidal distortion amount A due to only the yaw direction and pitch direction can be modeled as shown in Expression (24), using angular parameters $\omega$ and $\phi$ and the projected transformation expression shown in Expression (2). In Expression (24), $-\cos \omega \sin \phi$ corresponding to $C_1$ in Expression (2) represents the yaw directional angular change, and $\sin \phi$ corresponding to $C_2$ therein represents the pitch directional angular change.

$$A = \frac{1}{(-\cos\omega\sin\varphi)x + y\sin\omega + \cos\omega\cos\varphi} \begin{pmatrix} \cos\varphi & 0 & \sin\varphi \\ \sin\omega\sin\varphi & \cos\omega & -\sin\omega\cos\varphi \\ -\cos\omega\sin\varphi & \sin\omega & \cos\omega\cos\varphi \end{pmatrix} \quad (24)$$

Now, trapezoidal distortion is a phenomenon which occurs due to not only shaking of the camera, but also due to camerawork as well. The trapezoidal distortion to be corrected is the trapezoidal distortion amount A due to only the shaking. Accordingly, the trapezoidal distortion estimation unit 128 estimates angular changed corresponding to shaking from the translation speed due to shaking (hereinafter referred to as "shaking translational speed").

The trapezoidal distortion estimation unit 128 calculates shaking translational speeds $h-h_f$ and $v-v_f$ from the horizontal direction and vertical direction translational speeds. The trapezoidal distortion estimation unit 128 then multiples the calculates shaking translational speeds $h-h_f$ and $v-v_f$ by specified coefficients m and n, and fixed coefficients p and q, thereby estimating angular changes "yaw" and "pitch" corresponding to shaking, in accordance with Expression 25.

$$\text{yaw}=m(h-h_f)\times p, \text{ pitch}=n(v-v_f)\times q \quad (25)$$

Note that the specified coefficients m and n are externally specified parameters, with "1" set as an initial value in trapezoidal distortion estimation processing. The fixed coefficients p and q are coefficients obtained statistically or logically, based on the correlation between angular change due to shaking and the shaking translational speed.

The trapezoidal distortion estimation unit 128 calculates the angular parameters $\omega$ and $\phi$ in accordance with Expression (26), using the values obtained in Expression (25).

$$-\cos\omega\sin\varphi = \text{yaw}, \sin\omega = \text{pitch}\left(-\frac{\pi}{2} \le \omega \le \frac{\pi}{2}, -\frac{\pi}{2} \le \varphi \le \frac{\pi}{2}\right) \quad (26)$$

Figure 24:
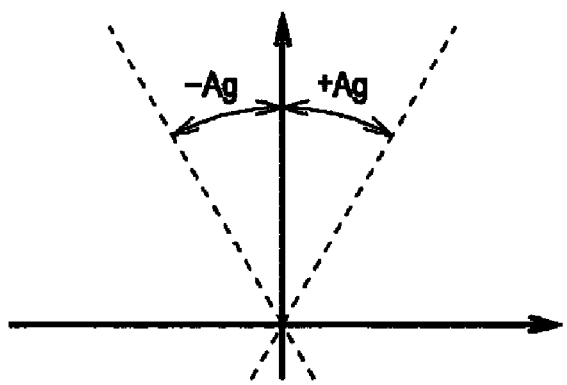
FIG. 24 is a schematic drawing for describing an appropriate angular range.
Figure 25:
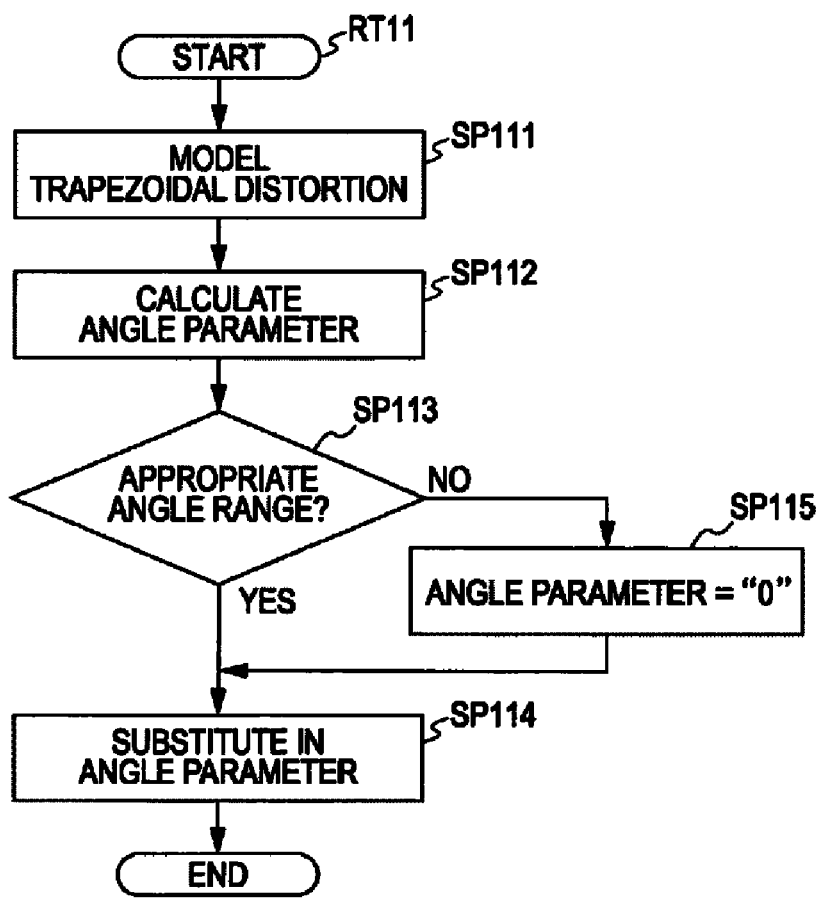
FIG. 25 is a flowchart for describing trapezoidal distortion estimation processing procedures.

However, if the angular parameters $\omega$ and $\phi$ are incorrect, the frame image will break down. Accordingly, the trapezoidal distortion estimation unit 128 determines whether or not the values of the angular parameters $\omega$ and $\phi$ are within an appropriate angular range $(-Ag°$ to$)+Ag°$, as shown in FIG. 24. In the event that the values of the angular parameters $\omega$ and $\phi$ are within an appropriate range, the trapezoidal distortion estimation unit 128 uses the angular parameters $\omega$ and $\phi$ as they are. On the other hand, in the event that the values of the angular parameters $\omega$ and $\phi$ are not within an appropriate range, the trapezoidal distortion estimation unit 128 deems the values of the angular parameters $\omega$ and $\phi$ to be "0".

The trapezoidal distortion estimation unit 128 substitutes the calculated values of the angular parameters $\omega$ and $\phi$ into Expression (24), thereby calculating trapezoidal distortion amount A as a matrix. The trapezoidal distortion estimation unit 128 supplies the trapezoidal distortion amount A to a correction vector generating unit 129. Thus, the trapezoidal distortion estimation unit 128 estimates the trapezoidal distortion amount A based on the motion component parameters h and v.

Next, trapezoidal distortion estimation processing procedure RT11 executed in accordance with the image processing program will be described with reference to the flowchart in FIG. 24. Upon the motion component parameters v and h being supplied, the trapezoidal distortion estimation unit 128 starts the trapezoidal distortion estimation processing procedure RT11 and advances the flow to step SP111.

In step SP111, the trapezoidal distortion estimation unit 128 models the trapezoidal distortion amount A by projected transformation in accordance with Expression (24), and advances the flow to the subsequent step SP112.

Next, in step SP112, the trapezoidal distortion estimation unit 128 calculates the angular parameters ω and φ, and advances the flow to the subsequent step SP113.

In step SP113, the trapezoidal distortion estimation unit 128 determines whether or not the angular parameters ω and φ are within an appropriate angular range. In the event that a positive result is obtained here, the trapezoidal distortion estimation unit 128 advances the flow to the subsequent step SP114. On the other hand, in the event that a negative result is obtained regarding this in step SP113, the probability that the angular parameters ω and φ are incorrect is high, so the trapezoidal distortion estimation unit 128 advances the flow to the subsequent step SP115.

In step SP115, the trapezoidal distortion estimation unit 128 replaces the values of the angular parameters ω and φ with zeroes, advances the flow to the subsequent step SP114.

In step SP114, the trapezoidal distortion estimation unit 128 substitutes the values of the angular parameters ω and φ into Expression (24), advances the flow to the end step, and ends the trapezoidal distortion estimation processing procedure RT11.

2-3-2. Correction Vector Generating Processing

As described above, with the first embodiment, the correction vector generating unit 29 generates a correction vector Vc based on the component separation expression shown in Expression (11). Conversely, the correction vector generating unit 129 generates a correction vector Vc based on a component separation expression including the trapezoidal distortion amount A, as shown in Expression (27).

$$\begin{pmatrix} x_1 \\ y_1 \\ 1 \end{pmatrix} = \begin{pmatrix} 1 & 0 & h_c \\ 0 & 1 & v_c \\ 0 & 0 & 1 \end{pmatrix} \begin{pmatrix} \frac{1}{P} & 0 & 0 \\ 0 & 1 & 0 \\ 0 & 0 & 1 \end{pmatrix} \begin{pmatrix} 1 & b_c & 0 \\ 0 & e_c & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$

$$\begin{pmatrix} s & 0 & 0 \\ 0 & s & 0 \\ 0 & 0 & 1 \end{pmatrix} \frac{1}{(-\cos\omega\sin\varphi)x + y\sin\omega + \cos\omega\cos\varphi} \begin{pmatrix} \cos\varphi & 0 & \sin\varphi \\ \sin\omega\sin\varphi & \cos\omega & -\sin\omega\cos\varphi \\ -\cos\omega\sin\varphi & \sin\omega & \cos\omega\cos\varphi \end{pmatrix}$$

$$\begin{pmatrix} P & 0 & 0 \\ 0 & 1 & 0 \\ 0 & 0 & 1 \end{pmatrix} \begin{pmatrix} 1 & 0 & -h_c \\ 0 & 1 & -v_c \\ 0 & 0 & 1 \end{pmatrix} \begin{pmatrix} x_0 \\ y_0 \\ 1 \end{pmatrix} = \begin{pmatrix} 1 & 0 & h_c \\ 0 & 1 & v_c \\ 0 & 0 & 1 \end{pmatrix} \begin{pmatrix} \frac{1}{P} & 0 & 0 \\ 0 & 1 & 0 \\ 0 & 0 & 1 \end{pmatrix}$$ (27)

$$\frac{1}{c_1 x + c_2 y + c_0} \begin{pmatrix} a_1 & a_2 & a_0 \\ b_1 & b_2 & b_0 \\ c_1 & c_2 & c_0 \end{pmatrix} \begin{pmatrix} P & 0 & 0 \\ 0 & 1 & 0 \\ 0 & 0 & 1 \end{pmatrix} \begin{pmatrix} 1 & 0 & -h_c \\ 0 & 1 & -v_c \\ 0 & 0 & 1 \end{pmatrix} \begin{pmatrix} x_0 \\ y_0 \\ 1 \end{pmatrix}$$

That is, with Expression (27) written in the same way as with Expression (17) through Expression (23), and thus modified, the correction vector Vc can be written as in Expression (28) Note that $A^{-1}$ is the reciprocal of the trapezoidal distortion amount A.

$$Vc = C^{-1} P^{-1} M_S^{-1} F^{-1} A^{-1} PC \quad (28)$$

The correction vector generating unit 129 is supplied with the motion component parameters θ, s, h, and v, the camera-work component parameters $\theta_f$, $s_f$, $h_f$, and $v_f$, the FP distortion parameters $e_c$ and $b_c$, and the trapezoidal distortion amount A. The correction vector generating unit 129 calculates the correction vector Vc following Expression (20) and Expression (28).

Thus, the correction vector generating unit 129 generates a correction vector Vc capable of correcting trapezoidal distortion in addition to the shaking and focal plane distortion in the frame image, by using the trapezoidal distortion amount A. Consequently, the motion compensation unit 30 can correct trapezoidal distortion in addition to the shaking and focal plane distortion in the frame image, by multiplying the global motion vector GMV with the correction vector Vc.

In other words, the image processing unit 113 can correct trapezoidal distortion due to angular change in the yaw direction and pitch direction, not just the roll direction. The image processing unit 113 performs image processing using affine transformation, but can yield advantages as if were performing image processing using projection transformation, as shown in Expression (27).

2-4. Additional Correction of Trapezoidal Distortion

Figure 26A:
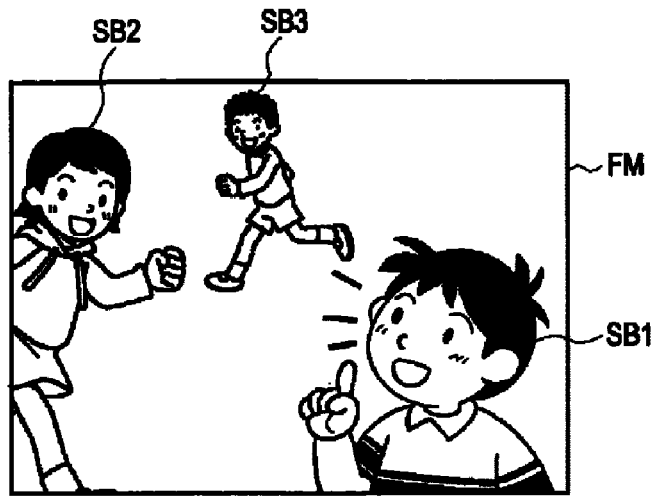
FIGS. 26A and 26B are schematic diagrams for describing addition correction of trapezoidal distortion.

Now, the trapezoidal distortion amount A is a value which changes due to not only the angular change in the yaw and pitch directions, but also in accordance with the distance between the subject and the camcorder 1. Accordingly, in the event that there are multiple subjects SB1 through SB3 at varying distances from the camcorder 1 within the frame image FM as shown in FIG. 26A, the trapezoidal distortion amount A will differ for each of the subjects SB1 through SB3.

Accordingly, the image processing unit 113 is arranged to perform additional correction of trapezoidal distortion in accordance with the desires of the user, by displaying the frame image FM of which the trapezoidal distortion has been corrected on the monitor unit 11 shown in FIG. 1.

Figure 26B:
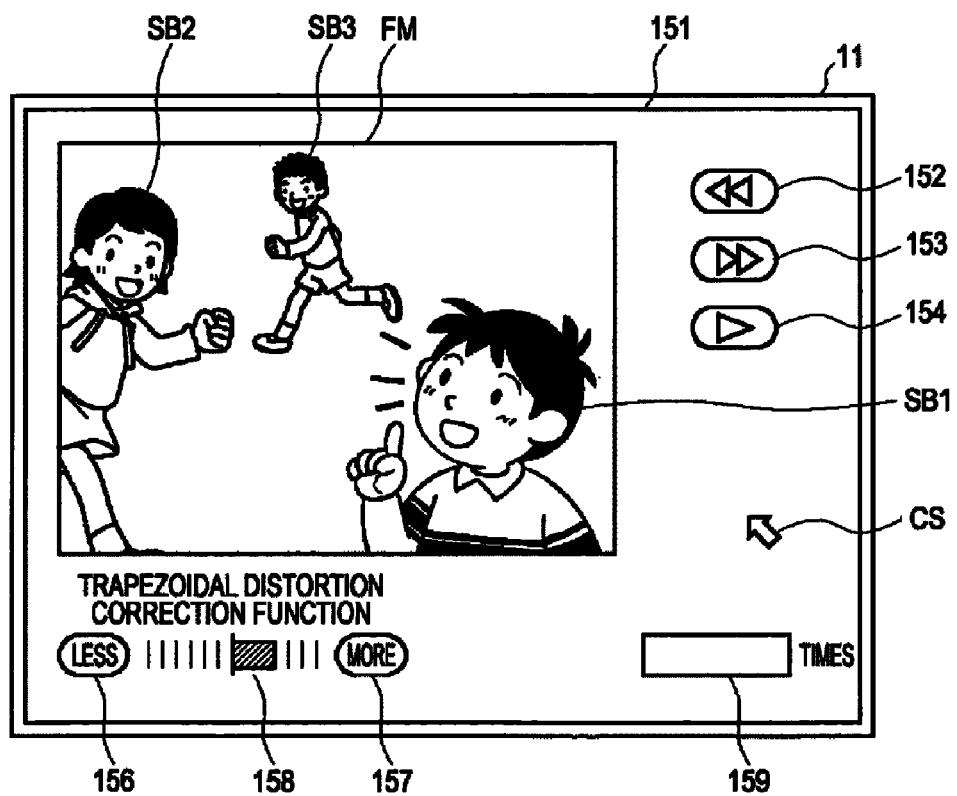

In the event that a user makes a request to perform addition correction processing of trapezoidal distortion using the operating unit 12 shown in FIG. 1, the image processing unit 113 displays an additional correction screen 151 on the monitor unit 11 as shown in FIG. 26B.

With the additional correction screen 151, the frame image FM corresponding to the frame image data is displayed at the upper left, and also displayed are a back button 152, a fast forward button 153, and a play button 154, for back, fast forward, and normal play of the frame image data.

For example, in the event that the user moves the mouse serving as the operating unit 12 to place a cursor CS over the play button 154 and clicks the mouse in this state, the play button 154 is selected. The other buttons are respectively selected in similar manner. The image processing unit 113 plays the frame image data here, so that the frame images FM are sequentially displayed on the monitor unit 11.

Displayed below the frame image FM are a trapezoidal distortion amount reduction button 156, a trapezoidal distortion amount increase button 157, and a trapezoidal distortion amount adjustment indicator 158. In the event that the trapezoidal distortion amount reduction button 156 is selected, the image processing unit 113 sets the trapezoidal distortion amount A to be small.

That is to say, in the event that the trapezoidal distortion amount reduction button 156 is selected, the image processing unit 113 supplies a request signal to the trapezoidal distortion estimation unit 128 to the effect that the trapezoidal distortion amount A is to be set so as to be small. The trapezoidal distortion estimation unit 128 multiples the values of the specified coefficients m and n in Expression (25) by, for example, 0.8, so as to calculate the trapezoidal distortion amount A in a state in which the values of the specified coefficients m and n are set small. As a result, the correction vector generating unit 129 is supplied with the trapezoidal distortion amount A being a relatively small value as to the shaking translational speed.

The correction vector generating unit 129 generates a correction vector Vc to correct the trapezoidal distortion by a trapezoidal distortion amount A which is a relatively small value, and supplies this to the motion compensation unit 30. The motion compensation unit 30 performs movement compensation processing of the frame image data based on the correction vector Vc, thereby correcting the trapezoidal distortion by a relatively small value as to the shaking translational speed, and displays the corrected frame image data on the monitor unit 11.

In the event that the trapezoidal distortion correction amount increase button 157 is selected, the image processing unit 113 similarly sets the trapezoidal distortion amount A to be great. In this case, the trapezoidal distortion estimation unit 128 multiples the values of the specified coefficients m and n in Expression (25) by, for example, 1.2.

That is to say, the image processing unit 113 allows the user to freely set the trapezoidal distortion amount A. Accordingly, the image processing unit 113 can cancel out trapezoidal distortion primarily focusing on one subject SB of the subjects SB1 through SB3 for example, or can cancel out the overall trapezoidal distortion of the frame image FM in an averaged manner, in accordance with selection made by the user. In other words, the image processing unit 113 can let the user freely select the degree of trapezoidal distortion correction.

The trapezoidal distortion amount adjustment indicator 158 is displayed as a back graph, indicating how much the trapezoidal distortion amount A has been increased or reduced from the initial value. Thus, the user can visually confirm the current additional correction amount of trapezoidal distortion on the image processing unit 113.

The image processing unit 113 also displays a trapezoidal distortion specification space 159 at the lower right of the additional correction screen 151. The image processing unit 113 allows the user to place the cursor CS over the trapezoidal distortion specification space 159 and input a numeric value using the operating unit 12, thereby specifying the values of the specified coefficients m and n.

Thus, the image processing unit 113 allows the user to freely select the trapezoidal distortion A regarding which precise estimation is difficult due to changing in accordance with the distance between the subject and the camcorder 1. Thus, the image processing unit 113 allows the user to generate frame image data according to his/her tastes by suitably adjusting the trapezoidal distortion in the frame image FM.

Figure 27:
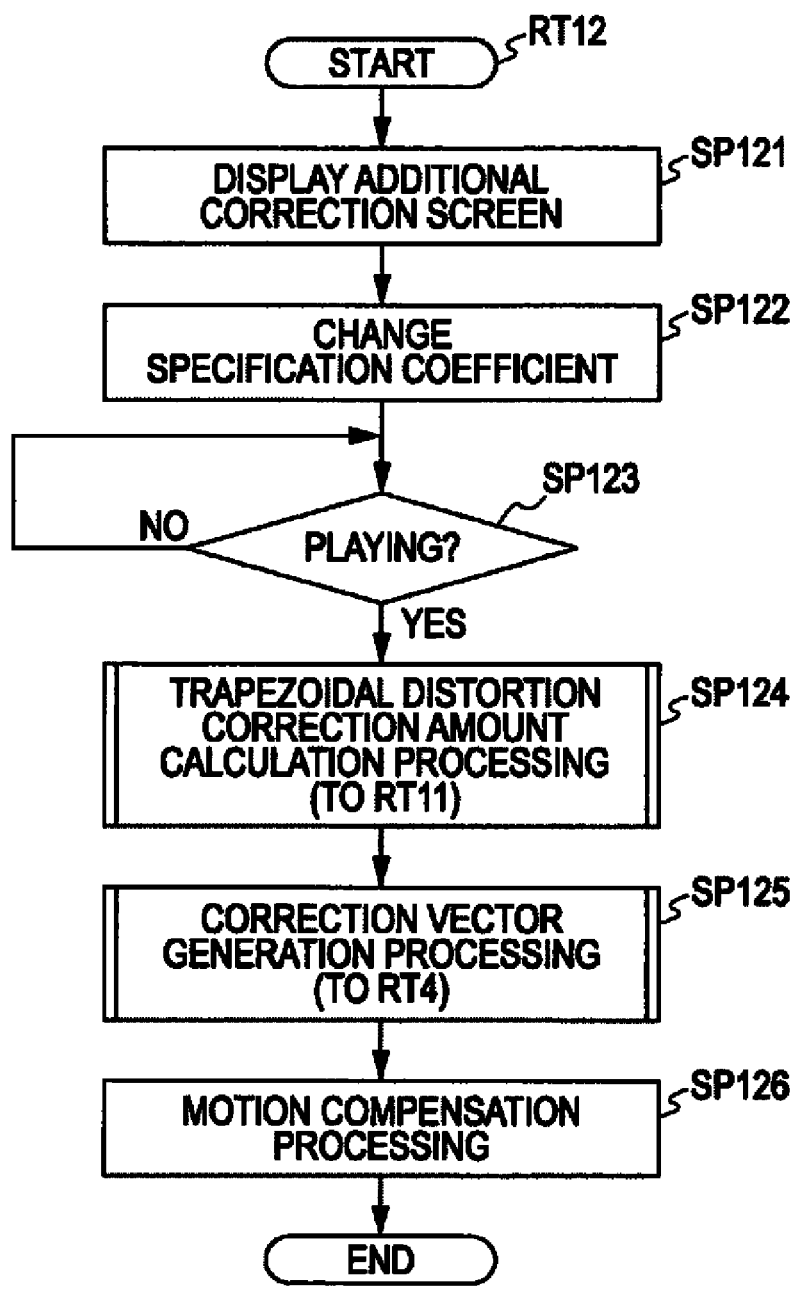
FIG. 27 is a flowchart for describing additional trapezoidal distortion correction processing procedures.

Next, the trapezoidal distortion additional correction processing procedure RT12 executed in accordance with the image processing program will be described with reference to the flowchart in FIG. 27. Upon the user making a request to the effect that additional correction processing of trapezoidal distortion is to be performed, in accordance with user operation input by way of the operating unit 12, the image processing unit 113 starts the trapezoidal distortion additional correction processing procedure RT12, and advances the flow to step SP 121.

In step SP 121, the image processing unit 113 displays the additional correction screen 151 on the monitor unit 11, and advances the flow to the subsequent step SP 122.

In step SP122, the image processing unit 113 changes the specified coefficients m and n in accordance with the user operation input, and advances the flow to the subsequent step SP 123.

In step SP123, the image processing unit 113 determines whether or not frame image data is currently being played, or a playing instruction has been given from the user, and in the event that a negative result is obtained here, the flow stands by in step SP 123 awaiting a play instruction from the user.

On the other hand, in the event that a positive result is obtained in step SP123, the image processing unit 113 advances the flow to the subsequent step SP 124 where the trapezoidal distortion correction amount calculation processing is executed in accordance with the trapezoidal distortion correction amount calculation processing procedure RT11 (FIG. 25), and then advances the flow to the subsequent step SP 125.

In step SP125, the image processing unit 113 executes correction vector generating processing in accordance with the correction vector generating processing procedure RT10, and advances the flow to the subsequent step SP 126.

In step SP126, the image processing unit 113 performs motion compensation processing. As a result, a frame image FM of which the trapezoidal distortion amount A has been corrected is displayed on the monitor 11. The image processing unit 113 advances the flow to the end step so as to end the trapezoidal distortion additional correction processing procedure RT12.

2-5. Operations and Advantages

Figure 28:
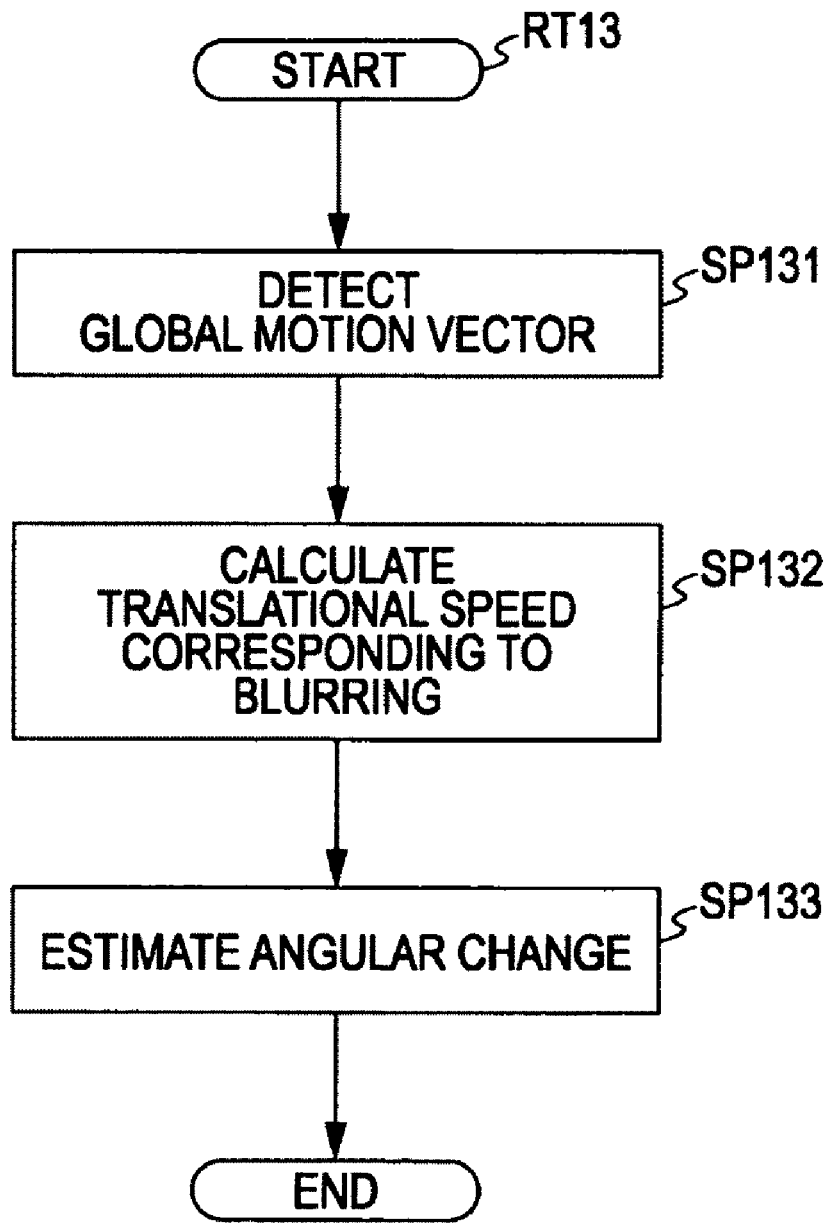
FIG. 28 is a flowchart for describing angular change estimation processing procedures.

With the above configuration, the image processing unit 113 detects a global motion vector GMV which represents the motion of the entire frame image, from the frame image data made up of frame images, as shown in FIG. 28, as translational speed (step SP131). The image processing unit 113 calculates the shaking translational speed corresponding to shaking from the translational speed of the global motion vector GMV (step SP132). The image processing unit 113 uses the correlation between the translational speed and angular change to estimate angular change from the detected global motion vector GMV (step SP133). Accordingly, the image processing unit 113 can calculate angular change with simple processing, in the post processing where detection of angular change using hardware sensors is inapplicable.

The image processing unit 113 calculates the trapezoidal distortion amount, which is the amount of trapezoidal distortion occurring in the frame image due to angular change, using the projection transformation expression (Expression (24)) based on the estimated angular change. Accordingly, the image processing unit 113 can calculate the trapezoidal distortion amount with easy processing.

The image processing unit 113 estimates the angular change corresponding to shaking, from the shaking translational speed, which is the translational speed corresponding to camera shaking, obtained by subtracting motion intended by the user from the camera motion component CM in the global motion vector GMV, thereby calculating the trapezoidal distortion amount A. Accordingly, the image processing unit 113 can calculate the trapezoidal distortion amount A which is trapezoidal distortion occurring due to shaking and regarding which correction is desirable.

The image processing unit 113 corrects the global motion vector GMV based on the trapezoidal distortion amount A corresponding to the shaking that has been calculated. Accordingly, the image processing unit 113 can reduce trapezoidal distortion corresponding to shaking in the frame image, thereby improving quality of the frame image data.

The image processing unit 113 detects the global motion vector GMV as an affine transformation expression made up of translational speed, enlargement/reduction speed, and angular change in one direction, and estimates angular change of the two directions other than this one direction.

That is to say, the image processing unit 113 processes the global motion vector GMV as an affine transformation expression representing rotation in only one direction so as to alleviate the processing load, and also performs trapezoidal distortion correction due to rotation in the yaw direction and pitch direction to which the affine transformation expression is inapplicable, in a follow-up manner. Consequently, the image processing unit 113 can correct the trapezoidal distortion in the three directions or roll, yaw, and pitch. Accordingly, the image processing unit 113 can yield the same advantages as with a case wherein the global motion vector GMV is modeled using a projection transformation expression such as shown in Expression (27), while processing the global motion vector GMV as an affine transformation expression.

The image processing unit 113 estimates the angular change in the yaw direction and pitch direction. Thus, the image processing unit 113 can use the translational speeds h and v to estimate angular change "yaw" and "pitch" in the yaw and pitch directions, having correlation with the translational speeds h and v.

The image processing unit 113 takes the camera motion component CM as at least translational element EMa and enlargement/reduction element EMc, and the accumulation value of focal plane distortion component CF as focal plane distortion correction amount CFc. In the event that the absolute value of the translational element EMa is below the reset threshold, the image processing unit 113 resets the FP distortion accumulation value which is the accumulation value of the focal plane distortion component CF.

Accordingly, the image processing unit 113 can use the accumulation value of the focal plane distortion component CF, and thus can prevent scattering of the FP distortion accumulation value by resetting the FP distortion accumulation value while suitably correcting the great part of the focal plane distortion component CF in the frame image.

The image processing unit 113 takes the camera motion component CM as at least at least translational element EMa and enlargement/reduction element EMc, and the FP distortion accumulation value of focal plane distortion correction amount CFc as FP distortion correction amount CFc, and reduces or eliminates the effects of the part of the focal plane distortion component CF which has little correlation with the translational element EMa. Accordingly, the image processing unit 113 can generate the focal plane distortion correction amount CFc mainly on the focal plane distortion component CF with high reliability, thereby enabling the precision of the focal plane distortion correction amount CFc to be improved.

According to the above configuration, the image processing unit 113 takes the global motion vector GMV as translational speed, and estimates the angular change from this translational speed. The image processing unit 113 thus can simplify the processing of handling the global motion vector GMV, and also perform various types of correction processing relating to angular change, based on the estimated angular change.

3. Third Embodiment

Portions of the third embodiment corresponding to those in the second embodiment illustrated in FIGS. 22 through 28 are denoted with the same reference numerals, and accordingly redundant description of such portions will be omitted here. While with the second embodiment, the correction vector generating unit 129 generates the correction vector Vc without changing the values of the component parameters following calculation of the trapezoidal distortion A, the third embodiment differs from the second embodiment in that the values of the component parameters are recalculated based on the trapezoidal distortion amount A.

3-1. Recalculation of Shaking Amount

As described above, with the first embodiment, the lens unit 3 of the camcorder 1 performs shaking correction by being driven in the yaw direction and pitch direction. Accordingly, angular change in the yaw direction and pitch direction is suppressed for the frame image data supplied to the image processing unit 13.

With the present embodiment, a lens unit 3× in a camcorder 1× (not shown in the drawings) corrects shaking in the frame image data by being driven in a sliding manner in the vertical direction and horizontal direction. Accordingly, the frame image data supplied to an image processing unit 213 which corresponds to the image processing unit 13 has no angular change in the yaw direction and pitch direction suppressed, so the effects in the yaw direction and pitch direction are markedly manifested in the global motion vector GMV. Accordingly, at the time of calculating the shaking amount $M_S$, the effects of trapezoidal distortion are preferably minimized, in the same way as with focal plane distortion. To this end, the image processing unit 213 is arranged to recalculate the shaking amount $M_S$ following calculation of the trapezoidal distortion amount A.

A trapezoidal distortion estimation unit 228 of the image processing unit 213 calculates the trapezoidal distortion amount A following Expressions (24) through (26), following which Expression (24) is substituted into Expression (27). The values here that are affected by angular change in the yaw direction and pitch direction are primarily the component parameters h and v. Accordingly, the trapezoidal distortion estimation unit 228 uses the values of the component parameters $\theta$, $e_c$, and $b_c$ without change, while setting the motion component parameters h and v as unknown parameters, and recalculates the motion component parameters h and v. Hereinafter, the recalculated motion component parameters will be referred to as "recalculated parameters", and written as $h_k$ and $v_k$.

The trapezoidal distortion estimation unit 228 subjects the recalculated parameters $h_k$ and $v_k$ to LPF processing to calculate the camerawork amount $M_C$, and supplies this to the correction vector generating unit 129 along with the trapezoidal distortion amount A. The correction vector generating unit 129 then generates the correction vector Vc following Expression (20) and Expression (28) in the same way as with the second embodiment, except for using the recalculated parameters $h_k$ and $v_k$ instead of the motion component parameters h and v.

Accordingly, the image processing unit 213 can generate the correction vector Vc using the recalculated parameters $h_k$ and $v_k$ in which trapezoidal distortion has been reduced, so the effects of trapezoidal distortion on the shaking amount $M_S$ can be reduced, and shaking can be corrected with high precision. Note that in the event that the trapezoidal distortion amount A is changed in the trapezoidal distortion additional correction processing, the image processing unit 213 may further recalculate the recalculated parameters $h_k$ and $v_k$ in the same way, or may use the initial recalculated parameters $h_k$ and $v_k$ as they are. Another arrangement is to allow the user to select which set of recalculated parameters $h_k$ and $v_k$ to be used.

Thus, the image processing unit 213 calculates the trapezoidal distortion A using the correlation between the translational speed in the vertical direction and horizontal direction and the angular change in the yaw direction and pitch direction. The image processing unit 213 calculates the recalculated parameters $h_k$ and $v_k$ from the shaking translational speed based on this correlation, thereby reducing the effects of the trapezoidal distortion in the shaking translational speed, so shaking can be corrected with high precision.

3-2. Operations and Advantages

With the above configuration, the image processing unit 213 uses the correlation between translational speed and angular change to cancel out the angular change corresponding to shaking, from translational speed $h-h_f$ and $v-v_f$ corresponding to shaking. Accordingly, the image processing unit 213 can alleviate the angular change due to shaking translational speed, thereby improving the calculation precision of the shaking amount $M_S$.

With the above configuration, the image processing unit 213 uses the correlation between translational speed and angular change to remove the angular change manifested in translational speed. Accordingly, the image processing unit 213 can remove the angular change, which is the trapezoidal distortion A to be corrected, from the shaking amount $M_S$, thereby improving the calculation precision of the shaking amount $M_S$.

4. Fourth Embodiment

4-1. Configuration of Image Processing Unit

Portions of the fourth embodiment corresponding to those in the first through third embodiments illustrated in FIGS. 1 through 26 are denoted with the same reference numerals, and accordingly redundant description of such portions will be omitted here. An image processing unit 313 according to the present embodiment is arranged to change the contents of image processing in accordance with the model of the camcorder with which the supplied frame image data has been taken.

For example, upon an unshown camcorder being connected, the image processing unit 313 obtains model information indicating the model name of the camcorder. The image processing unit 313 obtains technical information corresponding to the model name of the camcorder via an unshown network such as the Internet. This technical information includes the type of imaging device of the camcorder, shaking correction method employed, and fixed coefficient information.

In the event that the imaging device of the camcorder is a CCD (Charge Coupled Device) or the like, the image processing unit 313 replaces the focal plane distortion component CF in Expression (11) with a unit matrix. Thus, the image processing unit 313 can perform control such that focal plane distortion correction is not performed in cases wherein it is clear that focal plane distortion does not occur, thereby preventing the frame image from being disturbed by error occurring during such focal plane distortion correction. Note that the image processing unit 313 may be arranged so as to discard the focal plane distortion component CF by the filtering processing unit 25, or to replace the focal plane distortion component CF with a unit matrix by the correction vector generating unit 29.

The image processing unit 313 then performs shaking and trapezoidal distortion correction in accordance with the second embodiment, for example. At this time, the image processing unit 313 uses values indicated by the fixed coefficient information as fixed coefficients. Accordingly, the image processing unit 313 can use fixed coefficients matching the properties of the camcorder, thereby improving the precision in estimating trapezoidal distortion.

In the event that the shaking correction method is the lens rotation driving method as with the first and second embodiments, the image processing unit 313 performs shaking, focal plane distortion, and trapezoidal distortion correction in accordance with the second embodiment. At this time, the image processing unit 313 uses the values indicated by the fixed coefficient information as fixed coefficients. On the other hand, in the event that the shaking correction method is the lens sliding driving method as with the third embodiment, the image processing unit 313 performs shaking, focal plane distortion, and trapezoidal distortion correction in accordance with the third embodiment. At this time, the image processing unit 313 similarly uses the values indicated by the fixed coefficient information as fixed coefficients.

In this way, the image processing unit 313 and appropriately select image processing to be performed in accordance with the model of the camcorder, thereby improving the precision in correction of shaking, focal plane distortion, trapezoidal distortion, and so on.

4-2. Operations and Advantages

With the above configuration, the image processing unit 313 sets the values of the fixed coefficients p and/or q in accordance with the camcorder which is the imaging apparatus with which the frame image data has been taken. Accordingly, the image processing unit 313 can use appropriate fixed coefficients corresponding to the properties of the camcorder, thereby improving the precision in estimation of angular change, and consequently improving the precision in calculation of the trapezoidal distortion A.

The image processing unit 313 changes the contents of image processing in accordance with the method of shaking correction which the camcorder employs. In the event that the shaking control method is the lens rotation driving method, the image processing according to the second embodiment is performed, and in the event that the shaking control method is the lens sliding driving method, the image processing according to the third embodiment is performed. Accordingly, the image processing unit 313 can perform appropriate image processing corresponding to the shaking correction method of the camcorder.

The image processing unit 313 is arranged to replace the focal plane distortion component with a unit matrix in the event that the frame image data has been imaged by the global shutter method. Accordingly, the image processing unit 313 can perform suitable image processing in the same way even in the event that the frame image data has been imaged by the global shutter method.

With the above configuration, the image processing unit 313 can estimate suitable angular change in accordance with the properties of the camcorder, by changing the estimation amount of angular change in accordance with the camcorder with which the frame image data has been imaged.

5. Other Embodiments

While description has been made in the above first through fourth embodiments regarding arrangements wherein focal plane distortion is corrected using the focal plane distortion component CF, the present invention is not restricted regarding how to use the focal plane distortion component CF. For example, the shaking amount may be calculated from the focal plane distortion component CF. In this case as well, the quality of frame image data can be improved by shaking correction.

Also, while description has been made in the above first through fourth embodiments regarding arrangements wherein the focal plane distortion component CF is modeled to the FP distortion parallelogram element EFb and the FP distortion vertical direction enlargement/reduction element EFa, the present invention is not restricted to this, and the focal plane distortion component CF may be modeled to just one of these two in the event that just one readily occurs due to properties of the camcorder.

Also, while description has been made in the above first through fourth embodiments regarding arrangements wherein the frame image is corrected by the correction vector Vc based on the focal plane distortion component CF, the present invention is not restricted to this, and the frame image may be corrected by various methods, such as using correction coefficients, and so forth.

Also, while description has been made in the above first through fourth embodiments regarding arrangements wherein both the camera motion component CM and focal plane distortion component CF are calculated following Expression (11), the present invention is not restricted to this, and it is sufficient to calculate at least the focal plane distortion component CF.

Also, while description has been made in the above first embodiment regarding an arrangement wherein a frame image with little focal plane distortion is selected based on the translational speed, the present invention is not related to this, and an arrangement may be made wherein a frame image with little focal plane distortion is selected based on the accumulated value of focal plane distortion, for example.

Also, while description has been made in the above second embodiment regarding an arrangement wherein both resetting of the FP distortion accumulation value and reduction or elimination of the effects of focal plane distortion component CF not following a rule are performed, the present invention is not restricted to this, and an arrangement may be made wherein just one is performed. Also, an arrangement may be made wherein the values of the FP distortion component parameters are adjusted based on the magnitude of correlation between the FP distortion component parameters and the translational speed.

Also, while description has been made in the above first through fourth embodiments regarding arrangements wherein the camera motion component CM is modeled to the translational element EMa, rotational element EMb, and enlargement/reduction element EMc, the present invention is not restricted to this, and an arrangement may be made wherein the camera motion component CM is modeled to just the translational element EMa and enlargement/reduction element EMc, for example.

Also, while description has been made in the above first through fourth embodiments regarding arrangements wherein the component separation expression is written as a matrix expression, the present invention is not restricted to this, and an arrangement may be made wherein the component separation expression is written as a general equation.

Also, while description has been made in the above embodiments regarding arrangements wherein an origin correction matrix MC1 is multiplied before the rotation element EMb and an origin correction inverse matrix MC2 is multiplied after the rotation element EMb, the present invention is not restricted to this; this processing does not have to be performed in all cases, and can be omitted in cases wherein the origin is at or near the middle to begin with, for example.

Also, while description has been made in the above embodiments regarding arrangements wherein a pixel correction matrix MP1 is multiplied before the rotation element EMb and a pixel correction inverse matrix MP2 is multiplied after the rotation element EMb, the present invention is not restricted to this; this processing does not have to be performed in all cases, and can be omitted in cases wherein the pixel ratio is at or near 1:1 to begin with, for example.

Also, while description has been made in the above fourth embodiment regarding arrangements wherein the focal plane distortion component is replaced with a unit matrix in the event that the frame image has been taken with the global shutter method, the present invention is not restricted to this, and an arrangement may be made wherein image processing is performed for correcting just the trapezoidal distortion amount A.

Also, while description has been made in the above first through fourth embodiments regarding arrangements wherein the filtering processing unit 25 separates out the focal plane distortion component CF and camera motion component CM according to reliability information, the present invention is not restricted to this; filtering processing does not have to be performed in all cases, or may be performed on just one of the focal plane distortion component CF and camera motion component CM. Further, the motion detection unit 22 may take the sum of reliability indices as reliability information.

Also, while description has been made in the above second embodiment regarding arrangements wherein the specified coefficients m and n are changed by the user in the additional correction screen 151, the present invention is not restricted to this, and an arrangement may be made wherein two each of the trapezoidal distortion amount reduction button 156 and trapezoidal distortion amount increase button 157 are provided corresponding to the specified coefficients m and n, so that the user can select and change the specified coefficients m and n.

Also, while description has been made in the above fourth embodiment regarding arrangements wherein the model information is obtained at the time of supplying frame image data, the present invention is not restricted to this, and arrangements may be made wherein the user specifies the camcorder model name, the user specifies the fixed coefficients, and so on.

Also, while description has been made in the above first through fourth embodiments regarding arrangements wherein the frame image data supplied from the camcorder has already been subjected to shaking correction, the present invention is not restricted either way regarding whether or not there has been shaking correction to the frame image data.

Also, while description has been made in the above first through fourth embodiments regarding arrangements wherein the image processing terminal 10 which is an information processing device performs the image processing according to embodiments of the present invention, the present invention is not restricted to this, and arrangements may be made wherein an imaging apparatus having imaging functions performs the image processing according to the present invention, thereby enabling hardware sensors to be omitted from the configuration of the image processing device. Also, an arrangement may be made wherein hardware sensors and the image processing according to embodiments of the present invention are combined, such as carrying out the first embodiment while physically correcting just the angular change in the yaw and pitch directions with gyro sensors, for example.

Also, while description has been made in the above first through fourth embodiments regarding arrangements wherein the image processing program and the like are stored in ROM or a hard disk drive or the like beforehand, the present invention is not restricted to this, and arrangements may be made wherein image processing program and the like are stored in an external storage medium such as Memory Stick (a registered trademark of Sony Corporation) or the like and installed to flash memory or the like. Further, the image processing program may be externally obtained via USB (Universal Serial Bus), Ethernet, wireless LAN (Local Area Network) such as IEEE (Institute of Electrical and Electronics Engineers) 802.11a/b/g, and further may be distributed by way of terrestrial digital television broadcast or broadcasting satellite digital television broadcast.

Further, while description has been made in the above first through fourth embodiments regarding arrangements wherein a camcorder is used as a camera for imaging a subject as moving image data, the present invention is not restricted to this, and arrangements may be made wherein a camera built into a cell phone, moving image functions of a digital still camera, or the like, serve as the camera.

Moreover, while description has been made in the above first embodiment regarding arrangements wherein the image processing unit 13 serving as an image processing device is configured including the motion detection unit 22 serving as a motion detection unit and the component separation processing unit 23 serving as a modeling unit and component calculating unit, the present invention is not restricted to this, and arrangements may be made wherein the motion detection unit, modeling unit, and component calculating unit of other various configurations make up the image processing device.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
a motion detection unit configured to detect, from frame image data made up of frame images, motion vectors representing motion of said frame images;
a modeling unit configured to model said motion vector, received from said motion vector receiving unit, to a component separation expression in which a camera motion component and a focal plane distortion component are separated, using component parameters respectively representing camera motion which is motion of a camera, and the amount in change in focal plane distortion; and
a component calculation unit configured to calculate said component parameters used in said component separation expression, thereby calculating said focal plane distortion component in said motion vector,
wherein said modeling unit expresses said component separation expression as a matrix expression,
wherein said modeling unit expresses said camera motion component as
a translational element representing translational speed in the vertical direction and horizontal direction as to said frame image,
an enlargement/reduction element representing enlargement/reduction speed in an enlargement/reduction direction, and
a rotational element representing angular change in one direction, and
wherein said modeling unit
multiplies said component separation expression by
an origin correction matrix for moving an origin to the center, and
an aspect ratio correction matrix for changing an aspect ratio of pixels to 1:1,
before said rotational element, and
multiplies said component separation expression by
an origin correction inverse matrix for moving the origin from the center back to the original position, and
an aspect ratio correction inverse matrix for changing the aspect ratio of pixels back to the original aspect ratio,
after said rotational element.

2. An image processing device, comprising:
a motion detection unit configured to detect, from frame image data made up of frame images, motion vectors representing motion of said frame images;
a modeling unit configured to model said motion vector, received from said motion vector receiving unit, to a component separation expression in which a camera motion component and a focal plane distortion component are separated, using component parameters respectively representing camera motion which is motion of a camera, and the amount in change in focal plane distortion; and
a component calculation unit configured to calculate said component parameters used in said component separation expression, thereby calculating said focal plane distortion component in said motion vector,
wherein said modeling unit expresses said component separation expression as a matrix expression, and
wherein said modeling unit models said focal plane distortion component as in the following Expression $$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \quad (1)$$

where e and b are said component parameters.

3. The image processing device according to claim 2, wherein said modeling unit models said camera motion component as in the following Expression $$\begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} s & 0 & 0 \\ 0 & s & 0 \\ 0 & 0 & 1 \end{pmatrix} \quad (2)$$

where θ, h, v, and s are said component parameters.

4. The image processing device according to claim 3, wherein said modeling unit models said motion vector as in the following Expression $$\begin{pmatrix} x_1 \\ y_1 \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x_0 \\ y_0 \\ 1 \end{pmatrix} \quad (3)$$

$$= \begin{pmatrix} 1 & 0 & h_c \\ 0 & 1 & v_c \\ 0 & 0 & 1 \end{pmatrix} \begin{pmatrix} \frac{1}{p} & 0 & 0 \\ 0 & 1 & 0 \\ 0 & 0 & 1 \end{pmatrix} \begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix}$$

$$\begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} s & 0 & 0 \\ 0 & s & 0 \\ 0 & 0 & 1 \end{pmatrix} \begin{pmatrix} p & 0 & 0 \\ 0 & 1 & 0 \\ 0 & 0 & 1 \end{pmatrix}$$

$$\begin{pmatrix} 1 & 0 & -h_c \\ 0 & 1 & -v_c \\ 0 & 0 & 1 \end{pmatrix} \begin{pmatrix} x_0 \\ y_0 \\ 1 \end{pmatrix}.$$

5. An image processing device, comprising:
a motion vector receiving unit configured to receive, from frame image data made up of frame images, motion vectors representing motion of said frame images;
a modeling unit configured to model said motion vector, received from said motion vector receiving unit, to a component separation expression in which a camera motion component and a focal plane distortion component are separated, using component parameters respectively representing camera motion which is motion of a camera, and the amount in change in focal plane distortion;
a component calculation unit configured to calculate said component parameters used in said component separation expression, thereby calculating said focal plane distortion component in said motion vector; and
a correction unit configured to correct focal plane distortion in said frame image, based on said focal plane distortion component calculated by said component calculation unit,
wherein said modeling unit expresses said focal plane distortion component as an FP distortion parallelogram element and an FP distortion vertical direction enlargement/reduction element.

6. The image processing device according to claim 5, said correction unit including:
a correction amount calculation unit configured to calculate a focal plane distortion correction amount representing the amount of correction regarding said focal plane distortion performed as to said frame image, based on said focal plane distortion component calculated by said component calculation unit;
a correction vector generating unit configured to generate a correction vector for correcting said focal plane distortion in said motion vector, based on said focal plane distortion correction amount calculated by said correction amount calculation unit; and
a motion compensation unit configured to apply said correction vector generated by said correction vector generating unit to a processing frame image to be processed out of said frame images.

7. The image processing device according to claim 6, wherein said correction amount calculation unit selects, from said processing frame image and frame images immediately prior to and following said processing frame image of said frame images, a frame image where said focal plane distortion is the smallest, and calculates said focal plane distortion such that said focal plane distortion is at the same level of that of said selected frame image.

8. The image processing device according to claim 7, wherein said modeling unit expresses said camera motion component as at least
a translational element and
an enlargement/reduction element;
and wherein said correction amount calculation unit selects a frame image with the smallest focal plane distortion, based on said translational element.

9. The image processing device according to claim 8, wherein said modeling unit expresses said translational element as translational speed in a vertical direction and a horizontal direction;
and wherein said correction amount calculation unit
calculates said focal plane distortion correction amount corresponding to said FP distortion vertical direction enlargement/reduction element, based on said vertical direction translational speed, and
calculates said focal plane distortion correction amount corresponding to said FP distortion parallelogram element, based on said horizontal direction translational speed.

10. The image processing device according to claim 9, wherein, in the event that said frame image has been imaged with a global shutter method, said correction amount calculation unit replaces said focal plane distortion with a unit matrix.

11. The image processing device according to claim 10, wherein said modeling unit expresses said camera motion component as at least
a translational element and
an enlargement/reduction element;
and wherein said correction amount calculation unit takes an accumulation value of said focal plane distortion component as said focal plane distortion correction amount;
and wherein, in the event that the absolute value of said translational element is below a reset threshold, said correction amount calculation unit resets the accumulation value of said focal plane distortion component.

12. The image processing device according to claim 11, wherein said modeling unit expresses said camera motion component as at least
a translational element and
an enlargement/reduction element;
and wherein said correction amount calculation unit takes said translational element and
an accumulation value of said focal plane distortion component
as said focal plane distortion correction amount;
and wherein said correction amount calculation unit reduces or eliminates the effects of said focal plane distortion component regarding which correlation with said translational element is small.

13. A focal plane distortion component calculation method, comprising the steps of:
- detecting, from frame image data made up of frame images, motion vectors representing motion of said frame images;
- modeling said motion vector, received in said receiving, to a component separation expression in which a camera motion component and a focal plane distortion component are separated, using component parameters respectively representing camera motion which is motion of a camera, and the amount in change in focal plane distortion;
- calculating said component parameters used in said component separation expression by use of a component calculation unit, so as to calculate said focal plane distortion component in said motion vector; and
- correcting focal plane distortion in said frame image, based on said focal plane distortion component calculated by said component calculation unit,
- wherein said modeling step expresses said focal plane distortion component as an FP distortion parallelogram element and an FP distortion vertical direction enlargement/reduction element.

14. A non-transitory computer readable recording medium having stored thereon an image processing program causing a computer to execute the steps of:
- detecting, from frame image data made up of frame images, motion vectors representing motion of said frame images;
- modeling said motion vector, received in said receiving, to a component separation expression in which a camera motion component and a focal plane distortion component are separated, using component parameters respectively representing camera motion which is motion of a camera, and the amount in change in focal plane distortion;
- calculating said component parameters used in said component separation expression, so as to calculate said focal plane distortion component in said motion vector; and
- correcting focal plane distortion in said frame image, based on said focal plane distortion component calculated by said component calculation unit,
- wherein said modeling step expresses said focal plane distortion component as an FP distortion parallelogram element and an FP distortion vertical direction enlargement/reduction element.

* * * * *